(12) United States Patent
Vey et al.

(10) Patent No.: US 8,342,548 B1
(45) Date of Patent: Jan. 1, 2013

(54) LATERAL AIR BAG FOR TRIKE SUSPENSION

(75) Inventors: Jeffrey L. Vey, Troup, TX (US); John Petry, Troup, TX (US); Jeffrey D. Vey, Tyler, TX (US); Christopher Vey, Flint, TX (US); Adam Schumann, Troup, TX (US); Ryan Reineck, Whitehouse, TX (US)

(73) Assignee: Motor Trike, Inc., Troup, TX (US)

( * ) Notice: Subject to any disclaimer, the term of this patent is extended or adjusted under 35 U.S.C. 154(b) by 170 days.

(21) Appl. No.: 12/873,864

(22) Filed: Sep. 1, 2010

Related U.S. Application Data

(60) Provisional application No. 61/241,632, filed on Sep. 11, 2009.

(51) Int. Cl.
*B60G 11/00* (2006.01)

(52) U.S. Cl. .................. 280/124.164; 180/312; 180/377; 280/124.103

(58) Field of Classification Search ........... 280/124.103, 280/124.164, 124.134, 62; 180/210, 311, 180/312, 352, 375, 377, 378
See application file for complete search history.

(56) References Cited

U.S. PATENT DOCUMENTS

| | | | | |
|---|---|---|---|---|
| 2,226,435 A * | 12/1940 | Kolbe | ................... | 280/80.1 |
| 2,271,505 A * | 1/1942 | Kolbe | ................... | 280/124.103 |
| 2,280,044 A * | 4/1942 | Kolbe | ................... | 280/124.103 |
| 2,819,093 A * | 1/1958 | Geiser | ................... | 280/282 |
| 3,137,513 A * | 6/1964 | Marot | ................... | 280/124.103 |
| 3,598,385 A * | 8/1971 | Parsons, Jr. | ................... | 267/30 |
| 5,080,389 A * | 1/1992 | Kawano et al. | ........ | 280/124.142 |
| 5,265,692 A * | 11/1993 | Mallette | ................... | 180/193 |
| 5,364,114 A * | 11/1994 | Petersen | ............... | 280/124.151 |
| 5,575,352 A * | 11/1996 | Suzuki et al. | ................. | 180/311 |
| 5,921,339 A * | 7/1999 | Matsuura | ...................... | 180/219 |
| 6,250,649 B1 * | 6/2001 | Braun | ...................... | 280/5.506 |
| 6,719,313 B2 * | 4/2004 | Zadok | ................... | 280/124.106 |
| 6,793,228 B2 * | 9/2004 | Zadok | ................... | 280/124.134 |
| 6,889,787 B2 * | 5/2005 | Karpik | ...................... | 180/190 |
| 7,131,650 B2 * | 11/2006 | Melcher | ...................... | 280/5.52 |
| 7,143,861 B2 * | 12/2006 | Chu | ...................... | 180/346 |
| 7,207,408 B2 * | 4/2007 | Kuroki et al. | ................. | 180/210 |
| 7,228,930 B1 * | 6/2007 | Vey | ...................... | 180/210 |
| 7,234,982 B2 * | 6/2007 | Longdill et al. | ............. | 440/12.5 |
| 7,311,167 B2 * | 12/2007 | Takayanagi et al. | .......... | 180/215 |
| 7,762,368 B2 * | 7/2010 | Matthies | ...................... | 180/210 |
| 7,802,800 B2 * | 9/2010 | Melcher | ...................... | 280/5.509 |
| 7,967,306 B2 * | 6/2011 | Mighell | ................. | 280/124.103 |
| 7,967,309 B2 * | 6/2011 | Sellars et al. | ........... | 280/124.128 |
| 8,141,890 B2 * | 3/2012 | Hughes et al. | ......... | 280/124.103 |

(Continued)

FOREIGN PATENT DOCUMENTS

JP 05278426 A * 10/1993

*Primary Examiner* — Nicole Verley

(74) *Attorney, Agent, or Firm* — Jones, Walker, Waechter, Poitevent, Carrere & Denegre, L.L.P.

(57) ABSTRACT

A suspension system for a motor vehicle including a frame assembly; a differential supported on the frame assembly; two half shaft assemblies engaging the differential and being pivotally connected to the frame assembly; and at least one air spring operatively positioned between the frame assembly and each of the half shaft assemblies. The air springs are connected to a rotating linkage which maintains a substantially linear axis of compression for the air springs.

18 Claims, 19 Drawing Sheets

U.S. PATENT DOCUMENTS

| | | | |
|---|---|---|---|
| 8,177,013 B2 * | 5/2012 | Chang et al. | 180/215 |
| 2002/0041076 A1 * | 4/2002 | Becker et al. | 280/124.179 |
| 2002/0148664 A1 * | 10/2002 | Hanagan et al. | 180/210 |
| 2003/0221890 A1 * | 12/2003 | Fecteau et al. | 180/210 |
| 2004/0035624 A1 * | 2/2004 | Fecteau et al. | 180/210 |
| 2004/0119259 A1 * | 6/2004 | Takayanagi et al. | 280/124.134 |
| 2004/0188167 A1 * | 9/2004 | Kuroki et al. | 180/312 |
| 2007/0151780 A1 * | 7/2007 | Tonoli et al. | 180/65.1 |

* cited by examiner

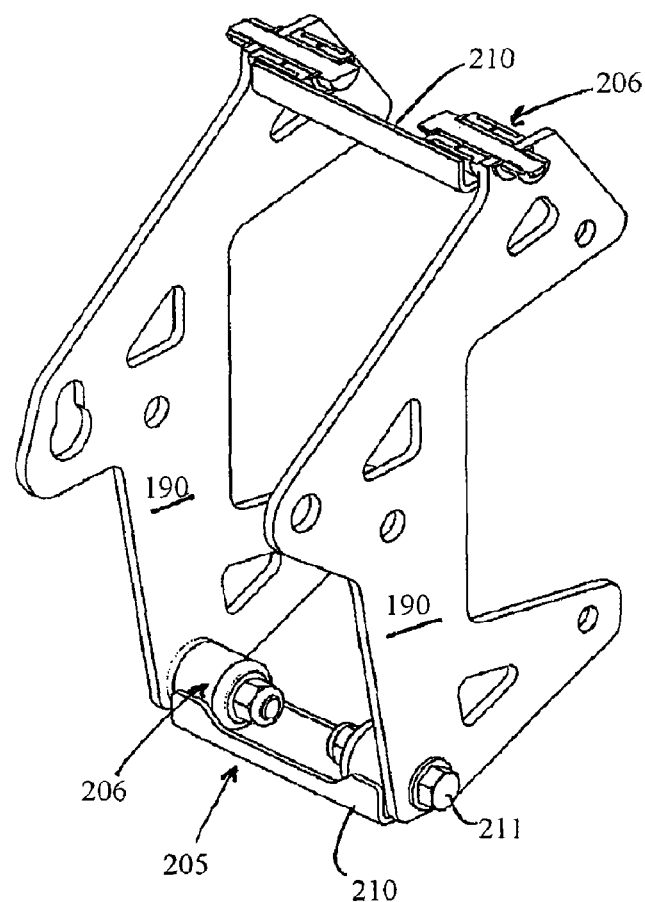
Figure 13
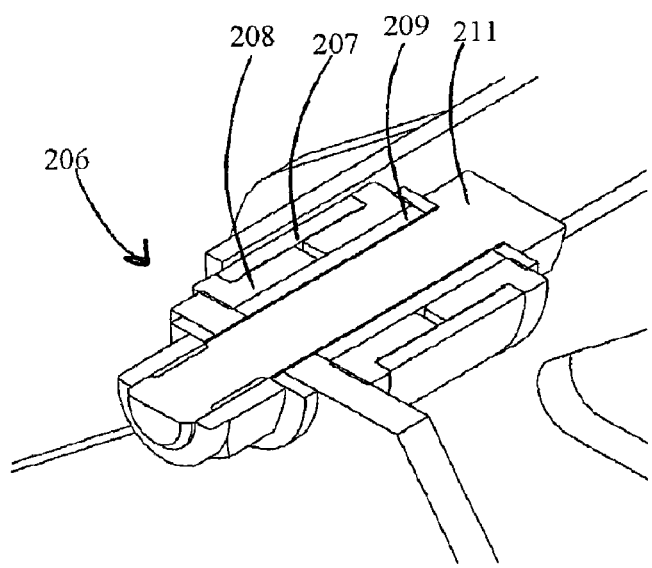

LATERAL AIR BAG FOR TRIKE SUSPENSION

This application claims the benefit under 35 USC §119(e) of provisional application no. 61/241,632, filed Sep. 11, 2009.

I. FIELD OF INVENTION

The present invention relates generally to vehicle suspension systems, and in certain embodiments, suspension systems for three wheeled motorcycles.

II. BACKGROUND OF INVENTION

There are numerous patents concerning apparatuses for converting conventional two wheel motorcycles into three wheel motorcycles or "trikes." Examples include U.S. Pat. Nos. 5,499,689, 5,884,717, and 6,964,314 and describe techniques for replacing the single rear wheel of a conventional motorcycle with a two wheel axle assembly. Additionally, the prior art includes using "air springs" or "air bags" as part of the suspension system for certain trikes; see for example U.S. Pat. No. 6,641,154.

However, the above patents deal with a unitary, rigid rear axle assembly connected to a differential. The above patents do not disclose trikes with an independent suspension, e.g., two half-shaft assemblies pivotally connected to the differential. Likewise, the above patents do not address shock absorbing mechanisms better suited for use with independent suspension systems.

III. BRIEF DESCRIPTION OF DRAWINGS

Figure 3:
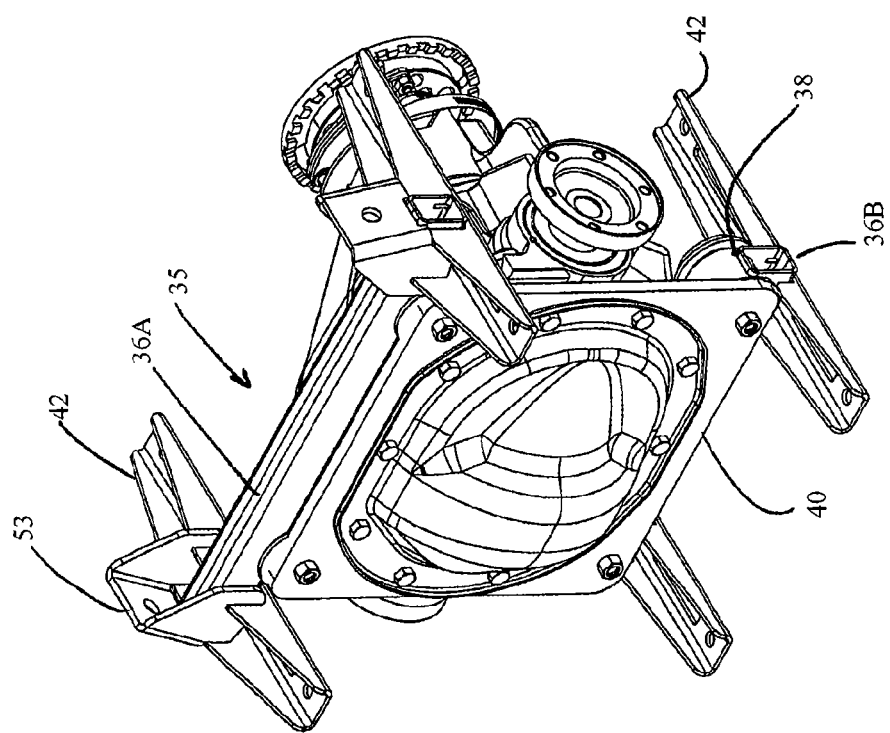

FIG. 3 illustrations one embodiment of the differential mounting system.

Figure 4:
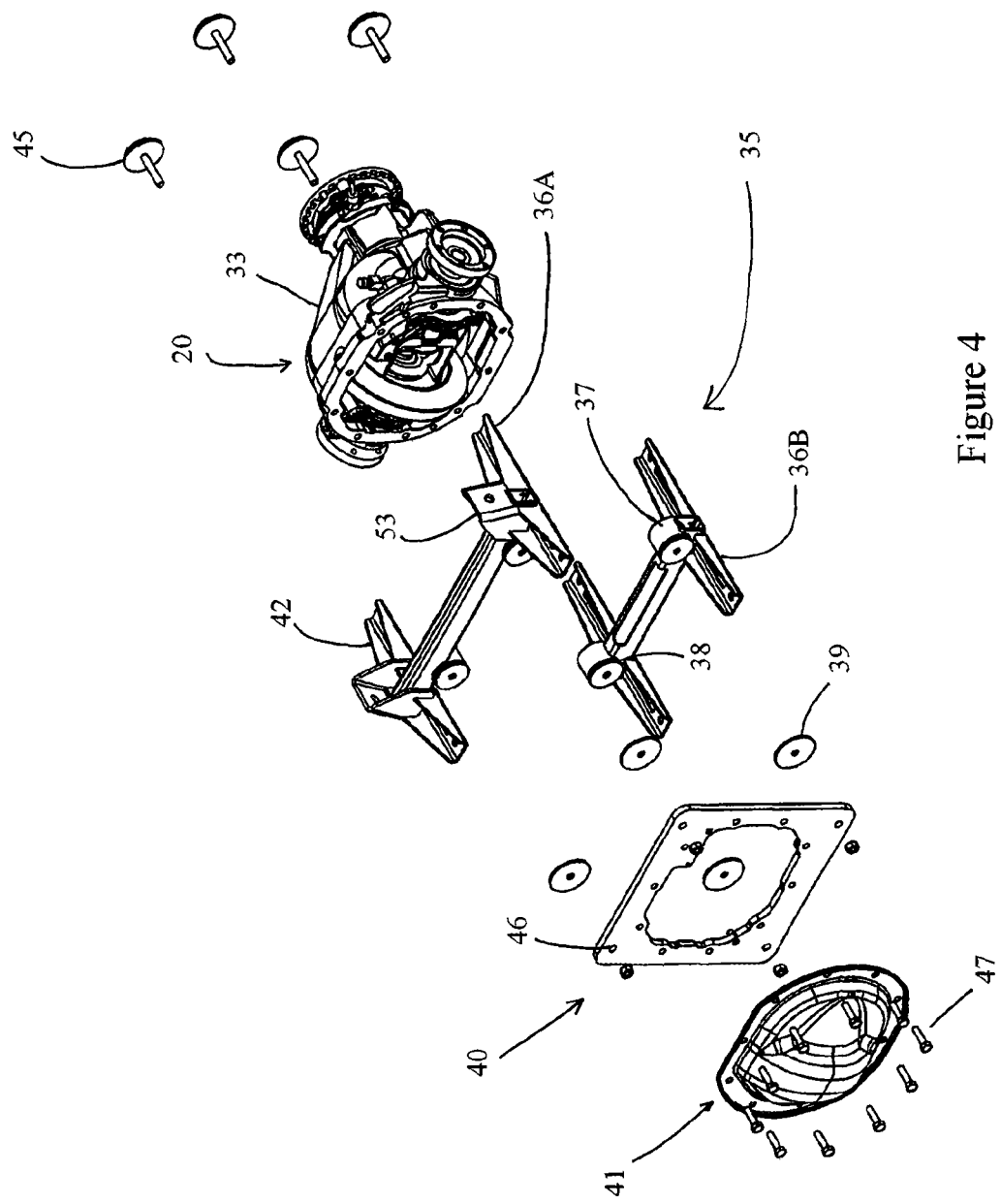

FIG. 4 is an exploded view of the mounting system seen in FIG. 3.

Figures 5A, 5B:
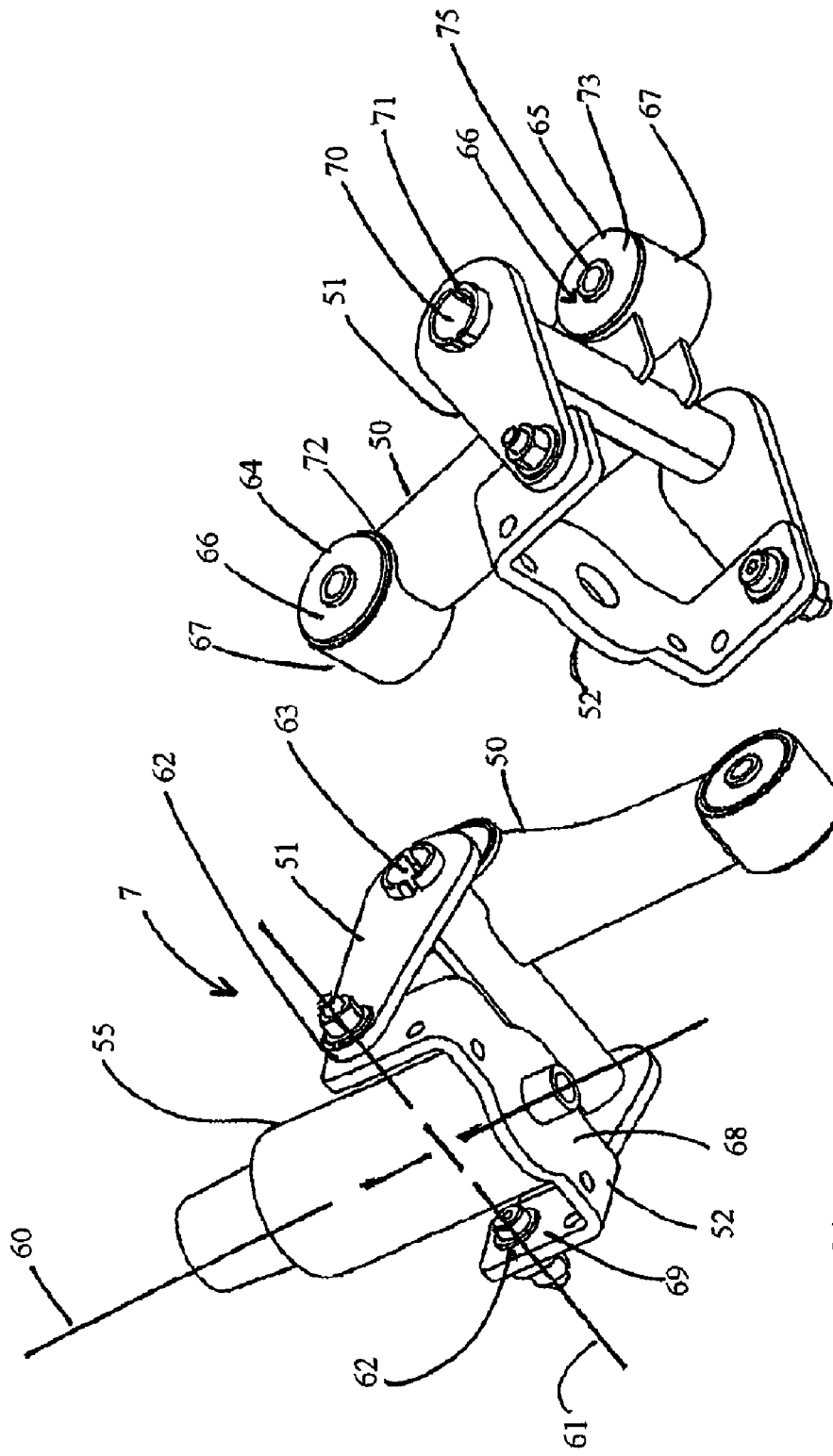

FIGS. 5A and 5B illustrate one embodiment of the rotating linkage.

Figure 1:
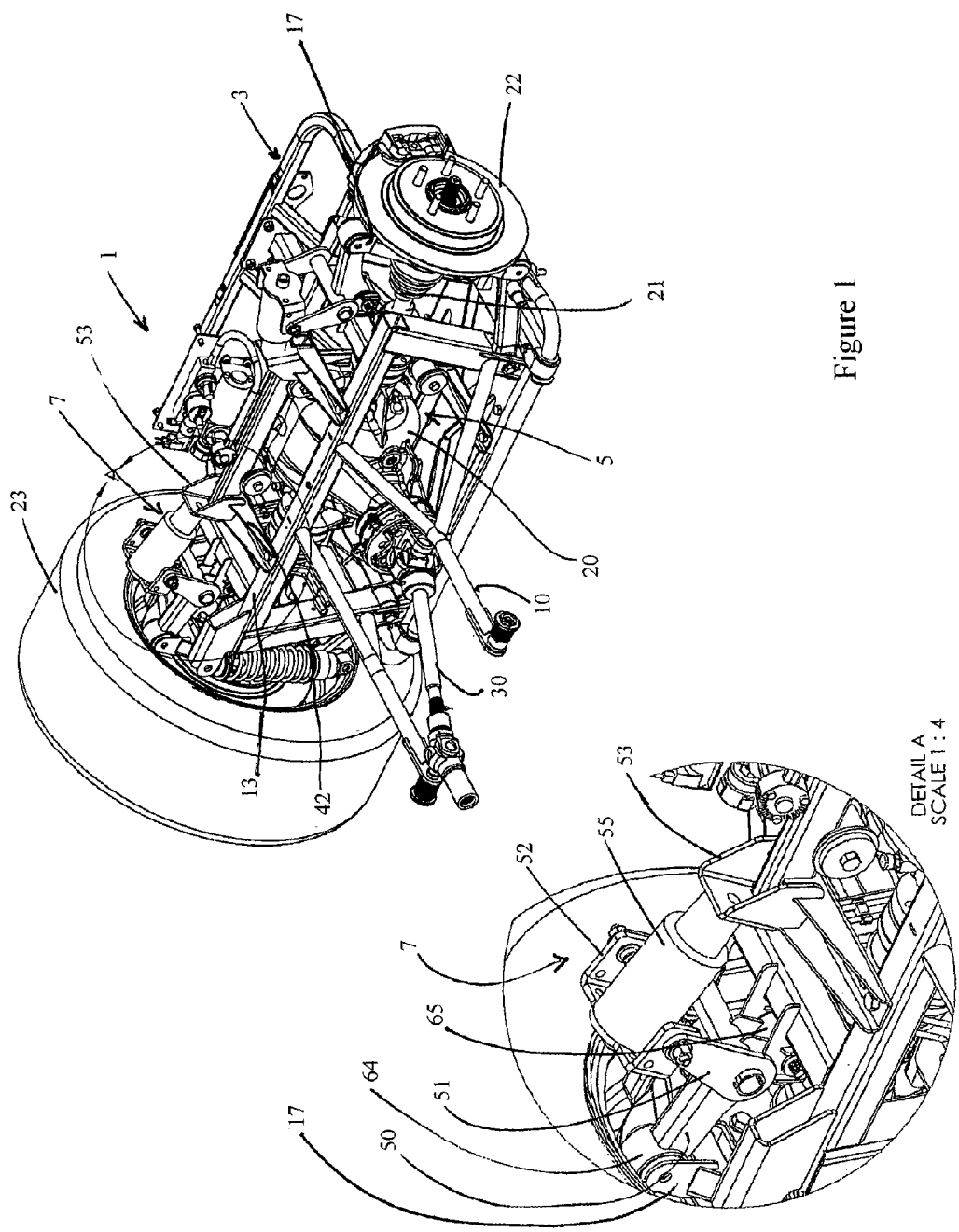
FIG. 1 illustrates one embodiment of the suspension system of the present invention.
Figure 6A:
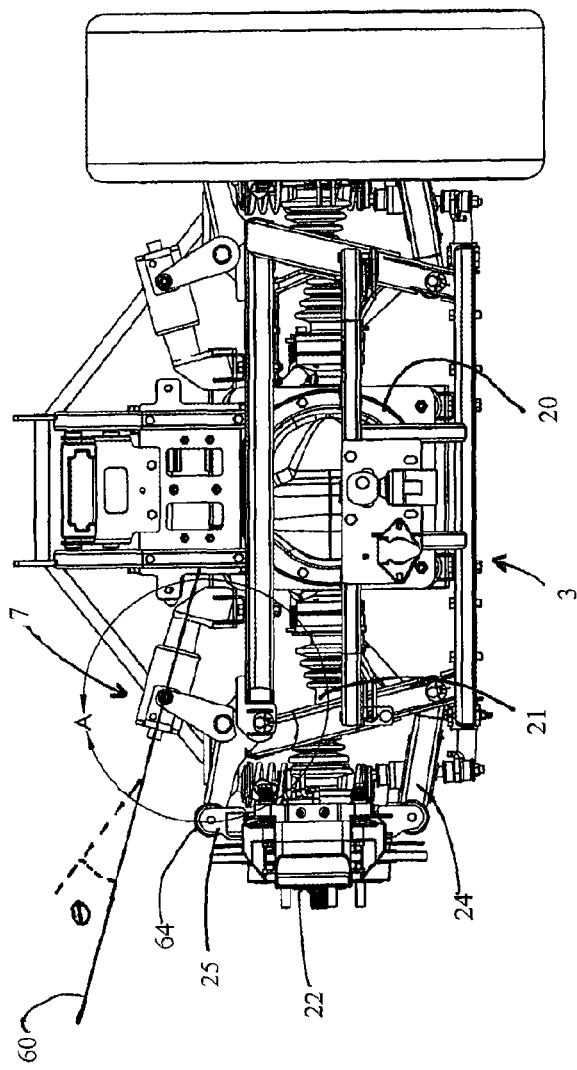
Figure 6A:
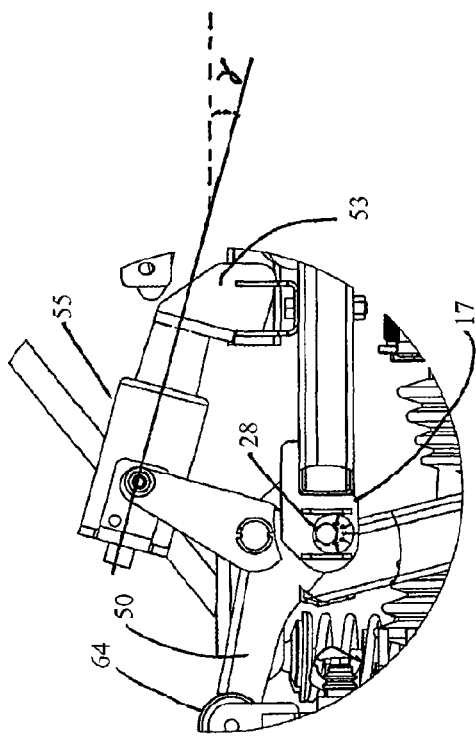
Figure 6B:
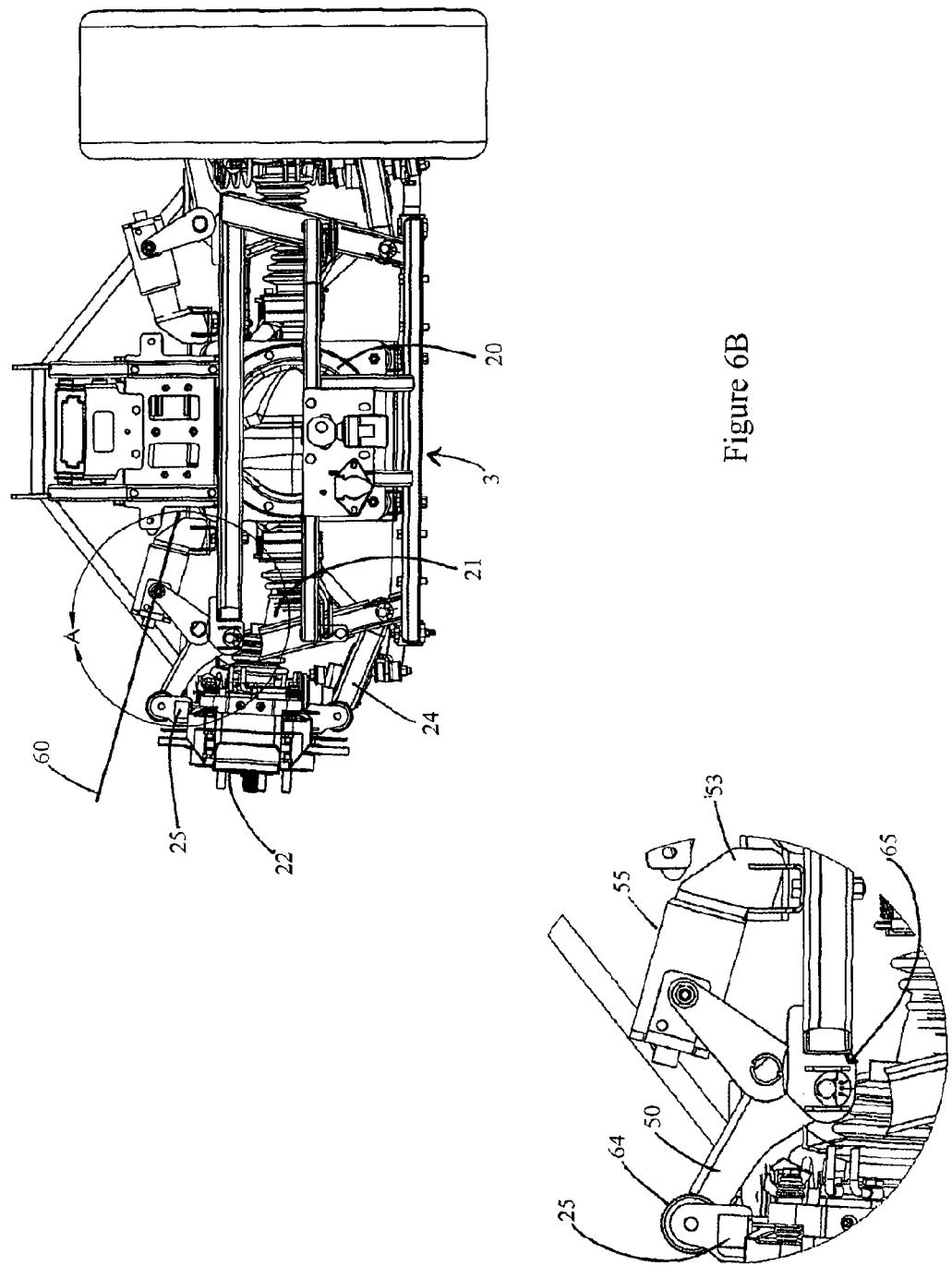

FIGS. 6A and 6B show the suspension system of FIG. 1 in two different wheel positions.

Figure 7:
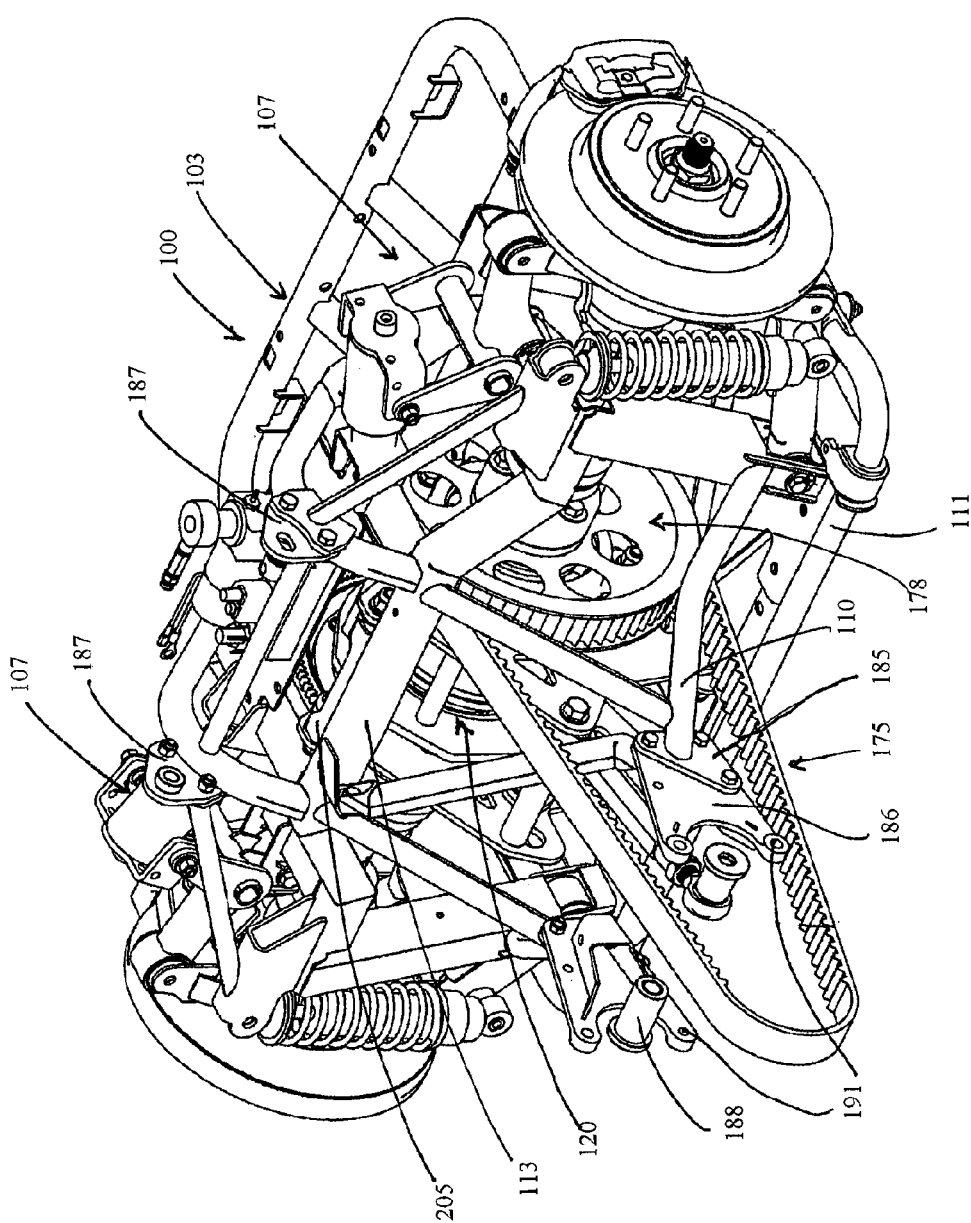

FIG. 7 illustrates a front perspective view of an alternative embodiment suspension system.

Figure 8:
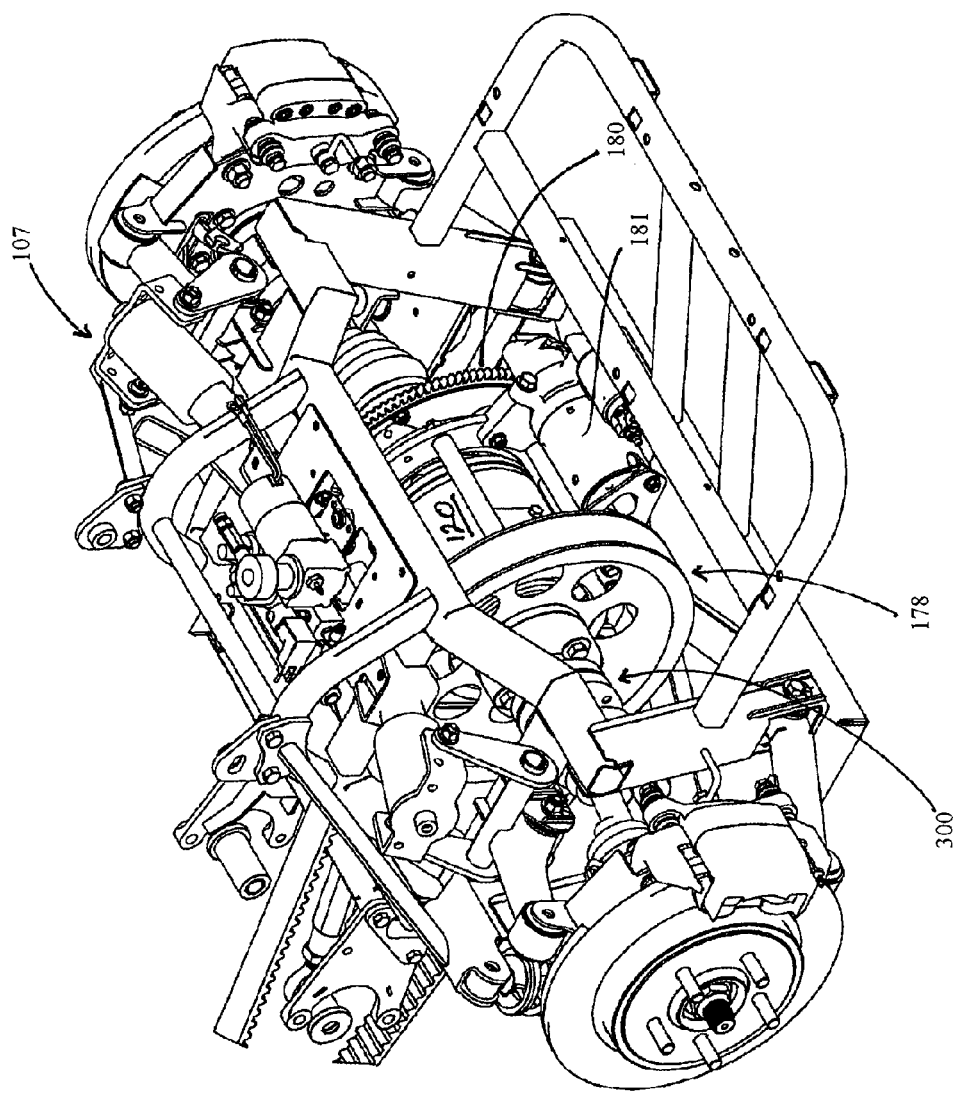

FIG. 8 illustrates a rear perspective view of the embodiment of FIG. 7.

Figure 9:
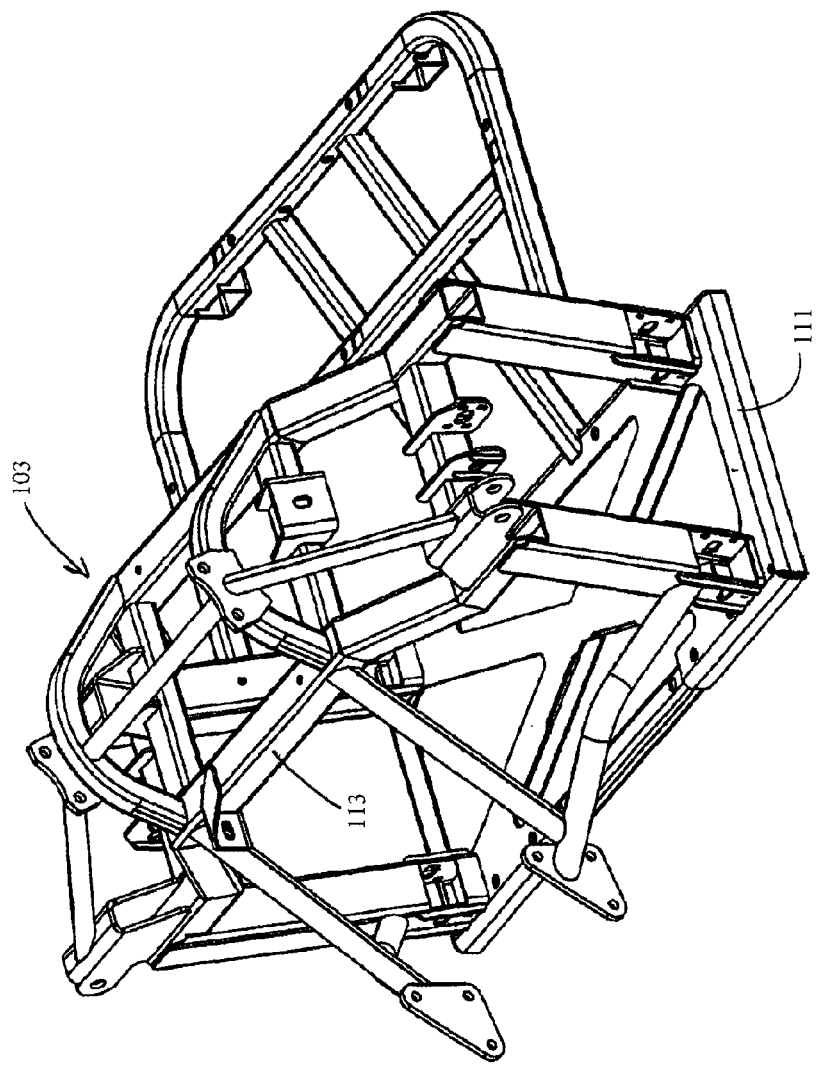

FIG. 9 illustrates the frame assembly of this embodiment.

Figure 10:
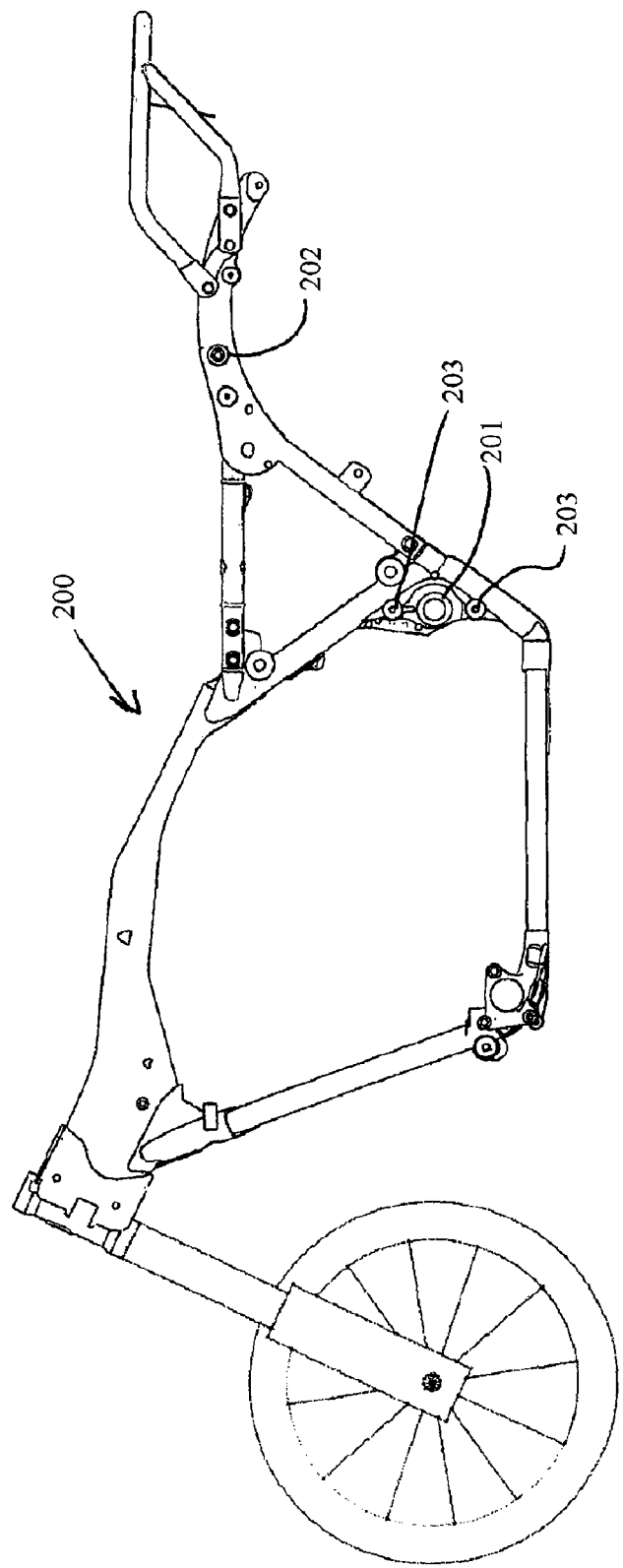

FIG. 10 illustrates an example motorcycle front frame assembly.

Figure 11A:
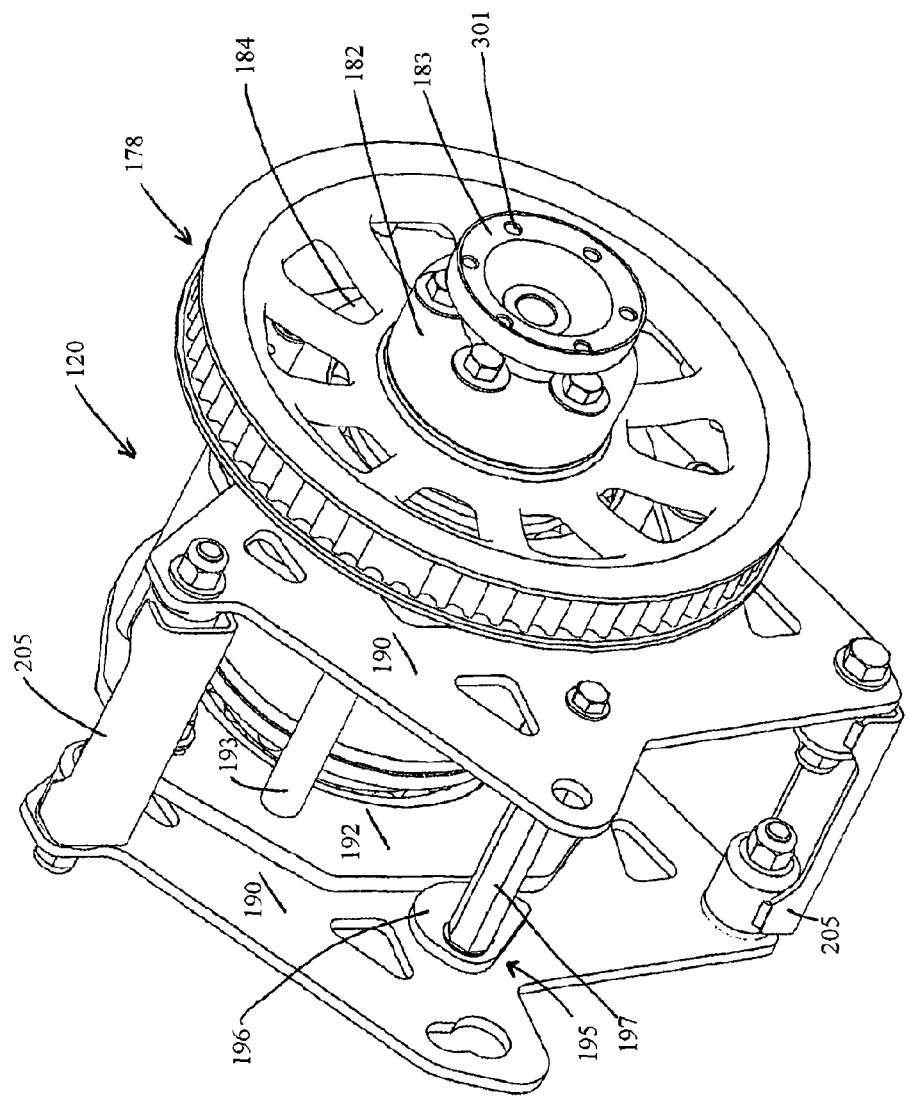
Figure 11B:
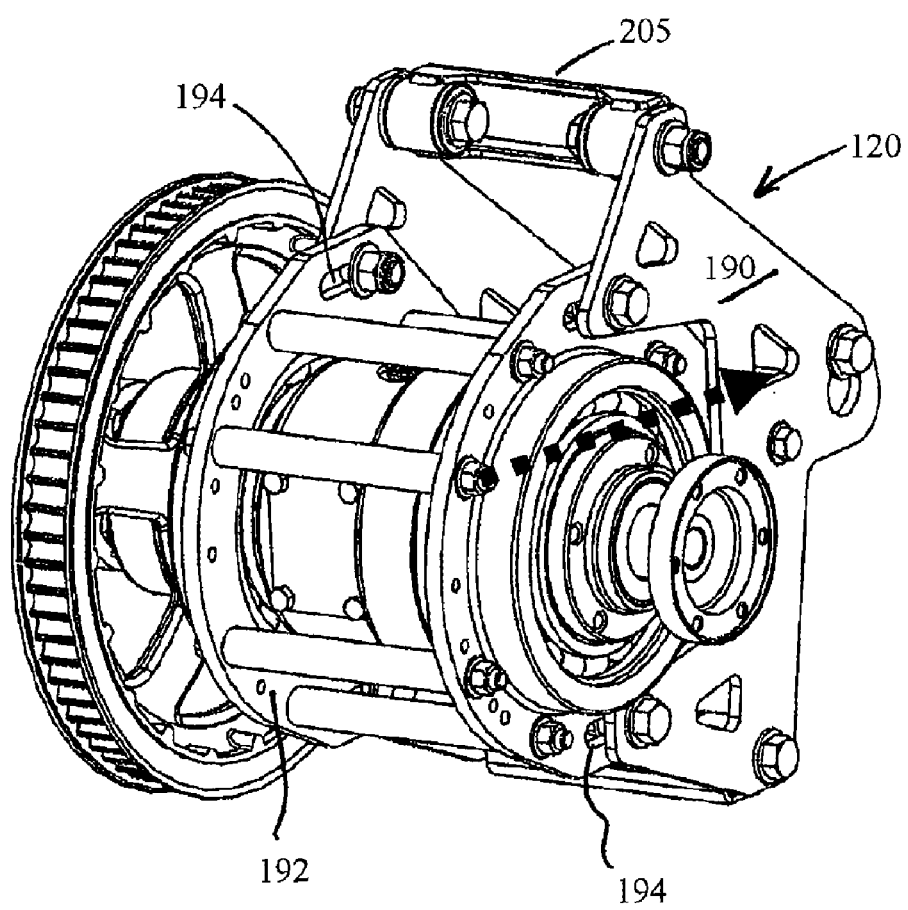

FIGS. 11A and 11B are perspective views of the differential assembly of the FIG. 7 embodiment.

FIG. 12 is a further disassembled view of the differential assembly.

FIG. 13 illustrates an embodiment of differential mounting plates.

Figure 14B:
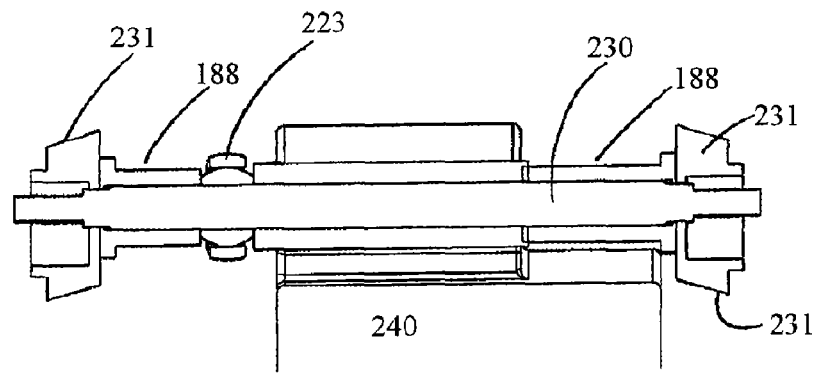
Figure 14A:
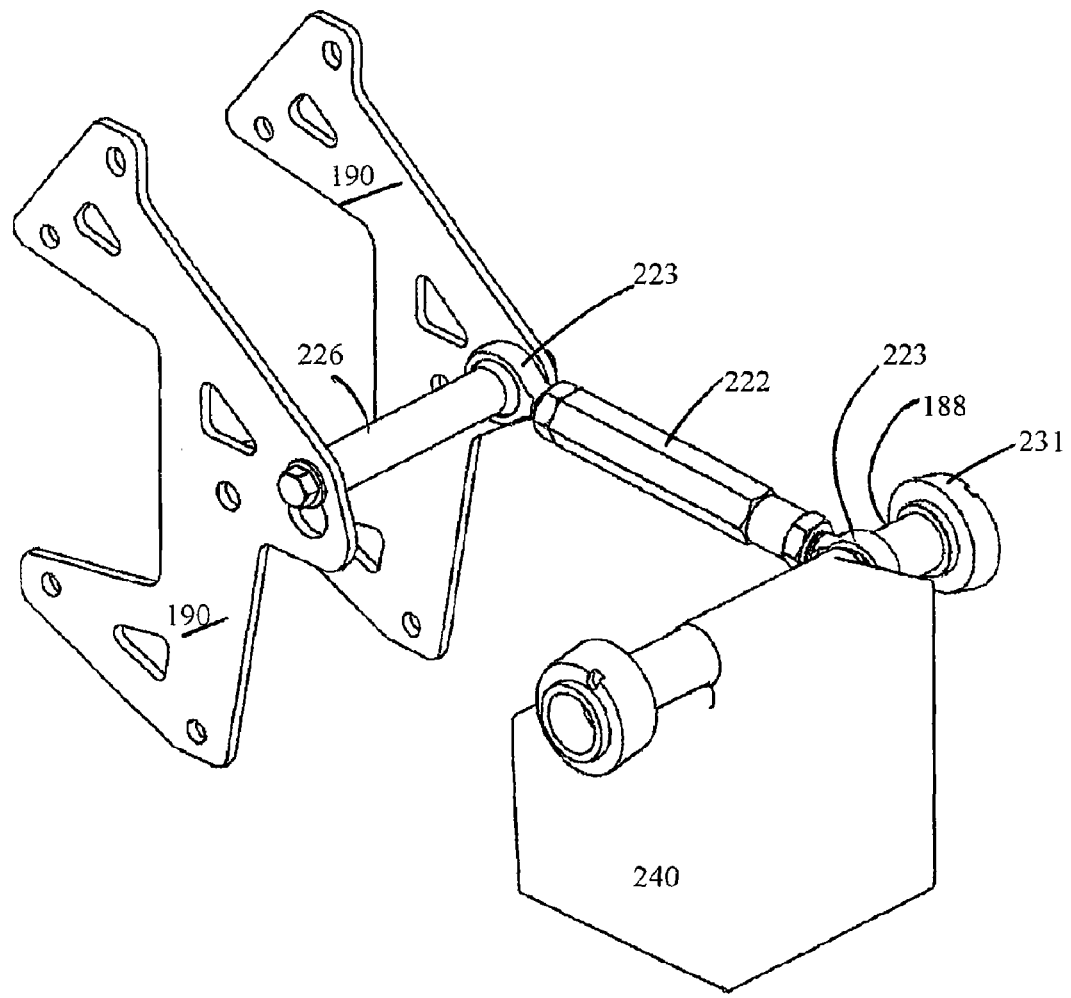

FIGS. 14A and 14B illustrate an embodiment of the trans-differential strut of the FIG. 7 embodiment and its connection to a swing arm axle.

Figure 15:
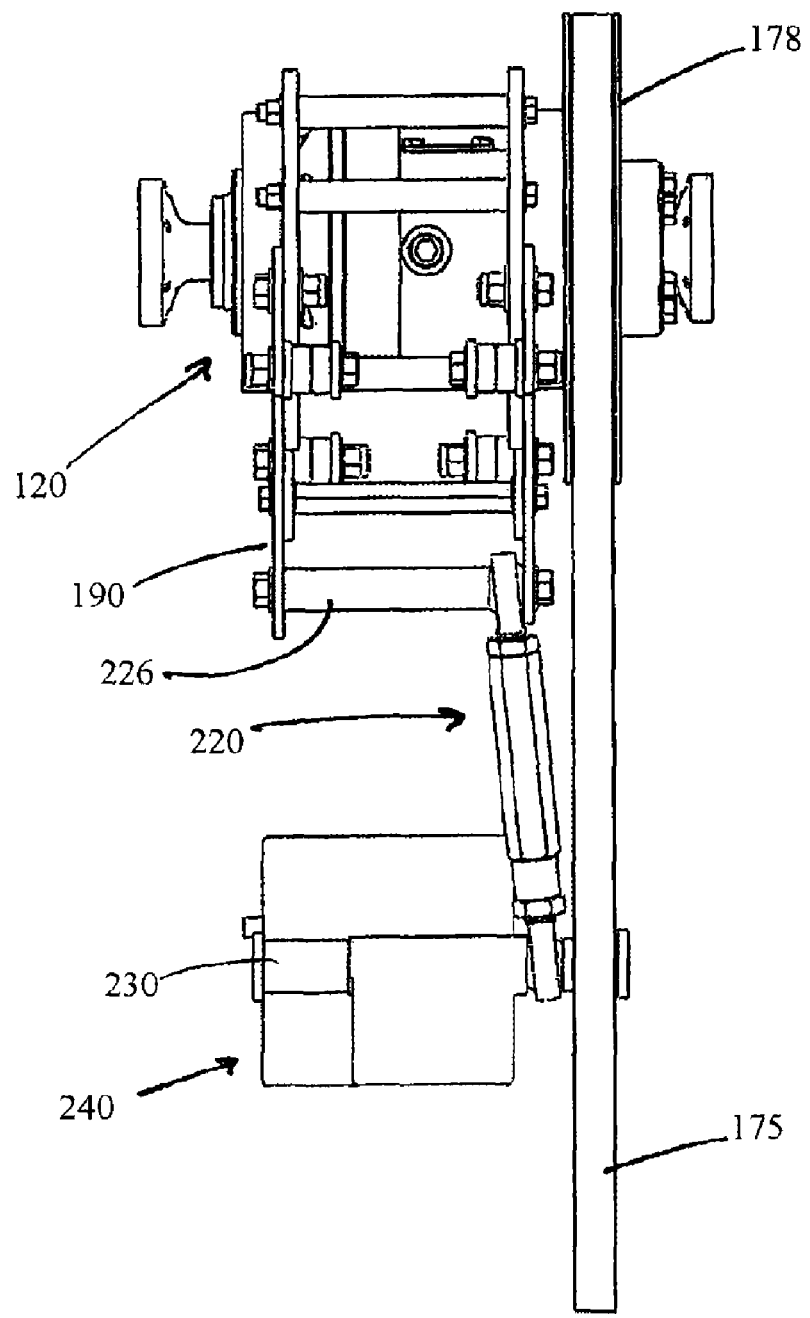

FIG. 15 is a top view of the trans-differential strut arrangement seen in FIG. 14A.

Figure 16:
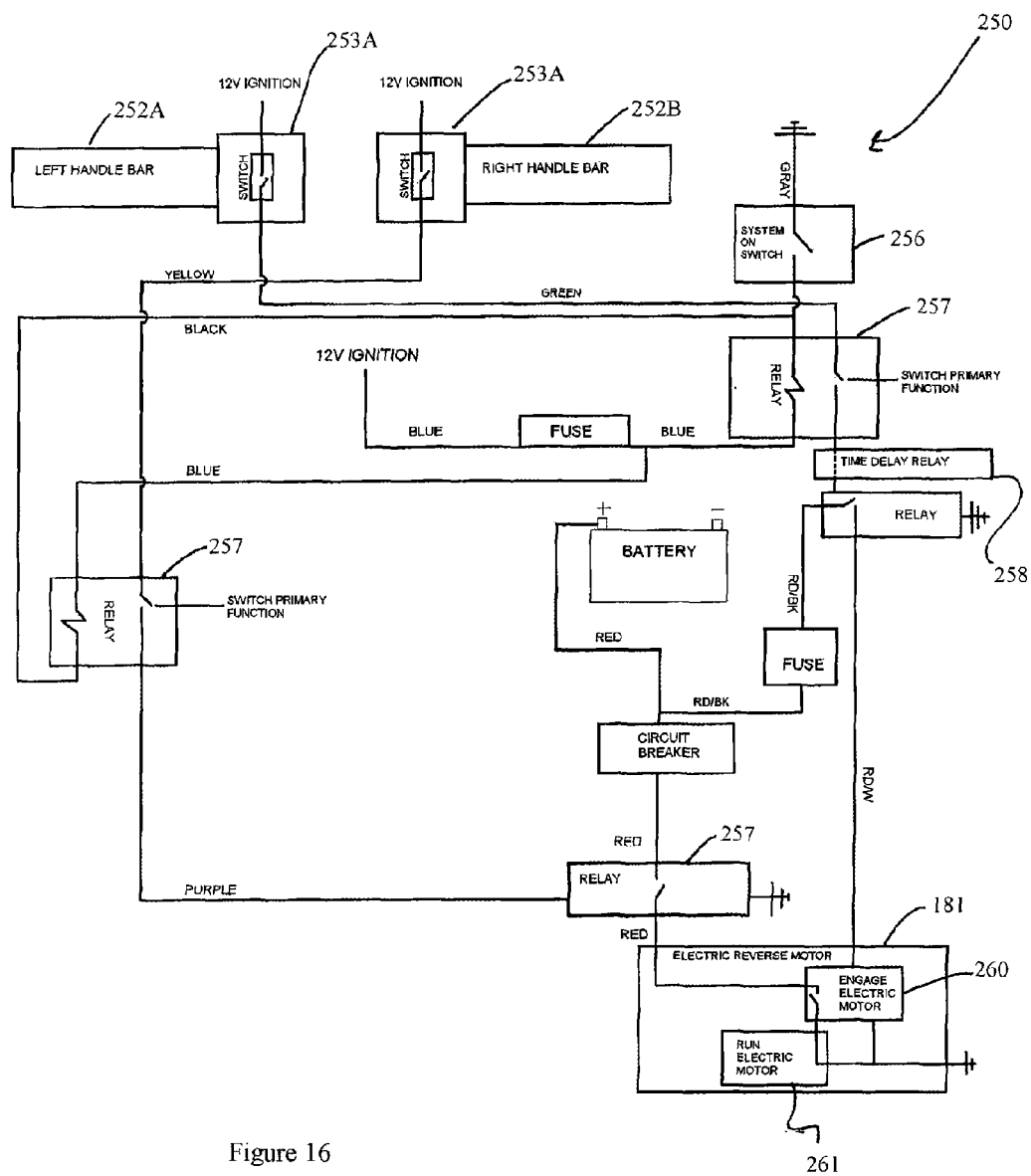

FIG. 16 is a schematic representation of a reverse motor activation circuit.

Figure 17:
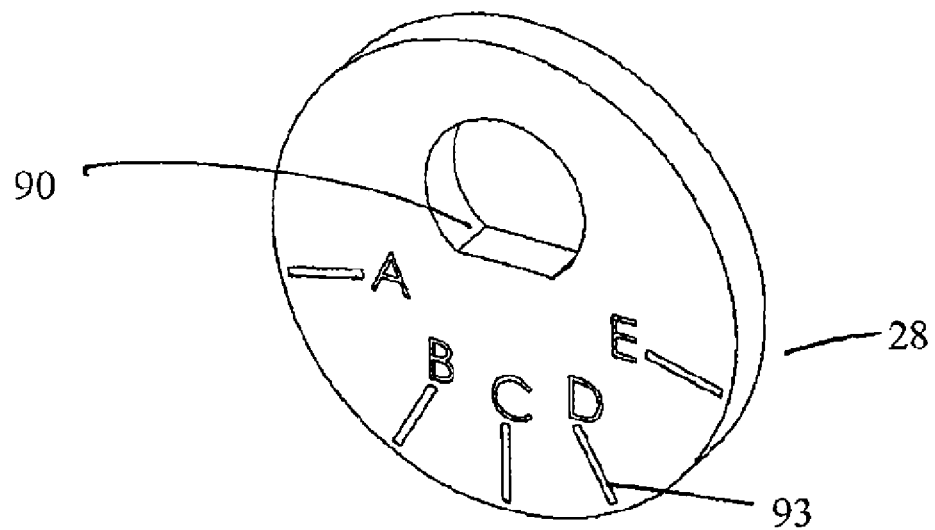
Figure 17:
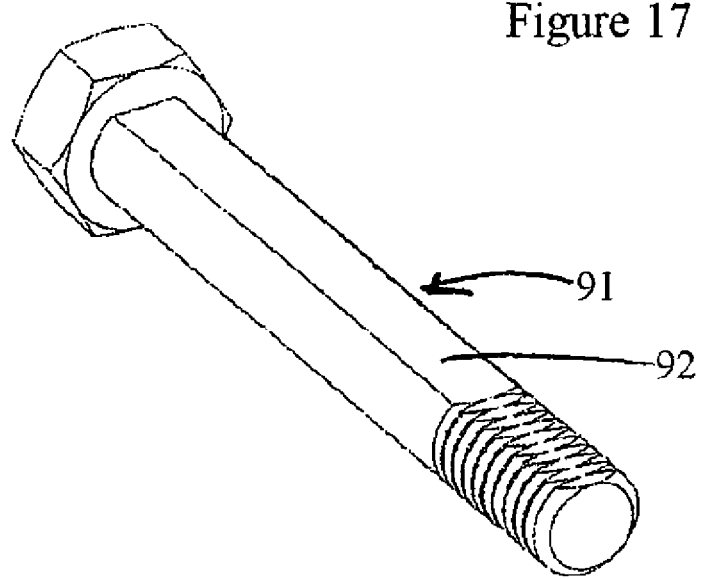

FIG. 17 illustrates one embodiment of a cam plate and keyed bolt.

IV. DETAILED DESCRIPTION OF SELECTED EMBODIMENTS

FIG. 1 illustrates one embodiment of the suspension system of the present invention. Although the current invention is not limited to use with trikes, the embodiment of FIG. 1 is a rear frame/axle assembly 1 designed to convert a shaft driven motorcycle into a trike. The rear frame/axle assembly 1 (also sometimes referred to herein as "rear frame" or "frame assembly") is shown in isolation in FIG. 1 (including the removal of certain frame elements to better see key features), but it will be understood that the rear frame/axle assembly will be connected to the main frame of a motorcycle such as described in U.S. Pat. No. 6,964,314, which is incorporated by reference herein. The embodiment of rear frame/axle assembly 1 seen in FIG. 1 generally comprises a frame assembly 3, a differential 20 supported on frame assembly 3, a drive shaft 30 supplying power to the differential 20, and two half-shaft assemblies 21 engaging the differential 20 and being pivotally connected to frame assembly 3 (see also FIG. 6A for rear view). Wheel hubs 22 will be connected to half-shaft assemblies 21 and wheel hubs 22 will support tires 23 in any well known conventional manner.

Figure 2:
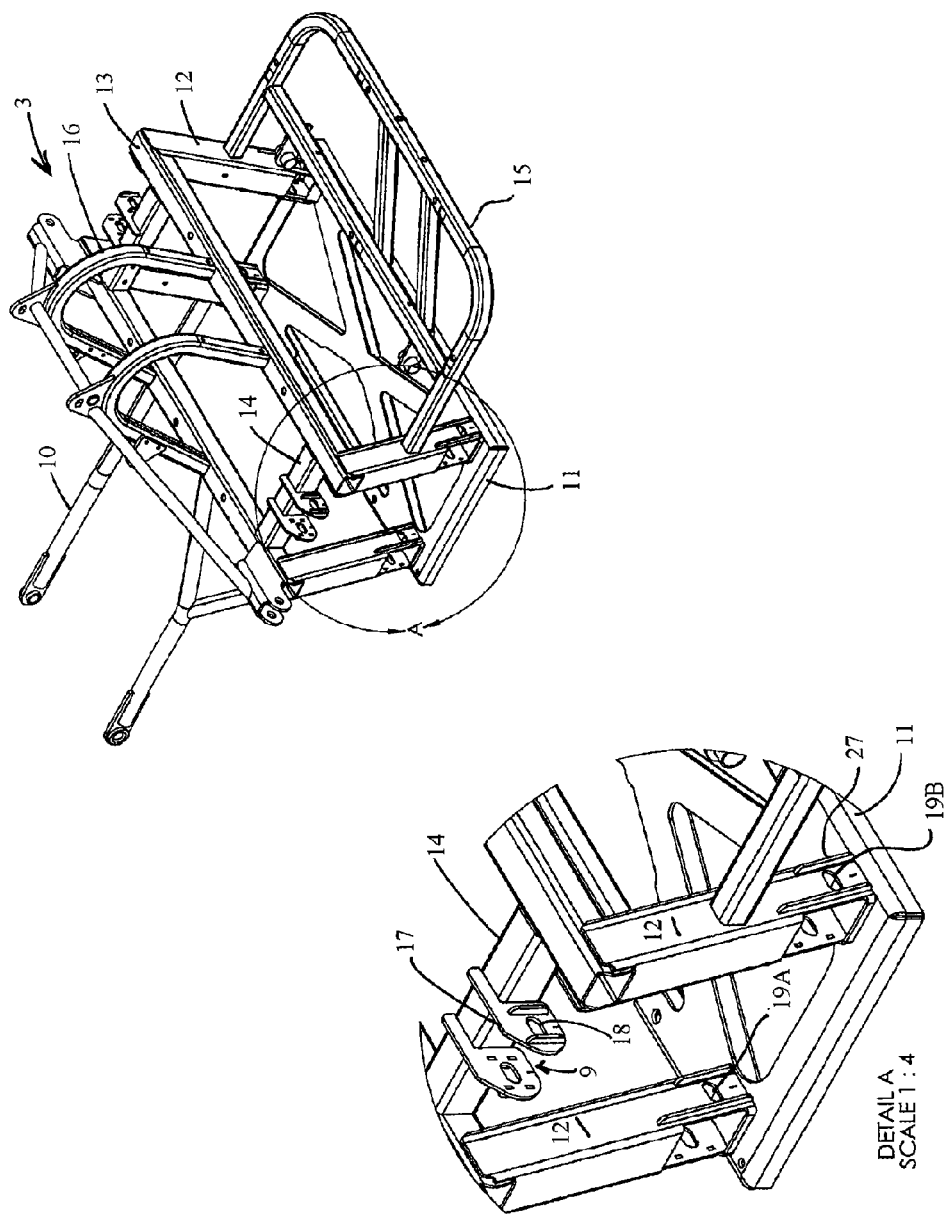
FIG. 2 illustrates one embodiment of the frame assembly.

FIG. 2 illustrates how frame assembly 3 will generally include base frame 11 and vertical frame members 12 extending upward from base frame 11. Upper lateral frame members 13 will connect between vertical frame members 12 and upper longitudinal frame members 14 will connect between lateral frame members 13. Attached to longitudinal frame members 14 are ear sections 17 having camber slots 18. Toe slots 19 are also formed in the lower portion of vertical members 12. The function of camber slots 18 and toe slots 19 are described in more detail below. The swing arm connectors 10 will form the connection between rear frame assembly 3 the motorcycle frame (not illustrated) as described in patents such as U.S. Pat. No. 6,964,314.

Returning to FIG. 1, rear frame/axle assembly 1 further includes an air spring linearization assembly 7. As seen in the detail of FIG. 1, this embodiment of linearization assembly 7 generally includes air spring 55 connected on a first end to rigid bracket 53 (which is in turn connected to frame assembly 3 as described further below in reference to FIGS. 3 and 4). The opposite end of air spring 55 is connected to seating bracket 52, which in turn is pivotally connected to link arm 51 which is rigidly connected to camber link 50. FIGS. 5A and 5B more clearly illustrate seating bracket 52, link arm 51, and camber link 50. One end of air spring 55 will connect to a base portion 68 of seating bracket 52 by any conventional means (typically a threaded bolt) and the flange portions 69 of seating bracket 52 will make a pivotal connection 62 with link arm 51. In the embodiment shown, the pivotal connection 62 is made by bronze bushings (hidden from view) being pressed into the apertures in link arm 51 and seating bracket 52 and a conventional shoulder bolt extending through the bronze bushings.

Link arm 51 makes a rigid (i.e., non-pivoting) connection with camber link 50 by engaging the keyed portion 71 of connector tube 70, after which link arm 51 is welded to connector tube 70. Camber link 50 has two pivoting connection joints 64 and 65, which in the illustrated embodiment are formed by NVH bushings 66 engaging cylinder or tube members 67. These NVH bushings 66 are formed of an outer metal sleeve 72, an inner metal sleeve 75, and an elastomeric polymer or rubber material 73 positioned between the two sleeves. In certain embodiments, the combination of camber link 50 and link arm 51 may be referred to as one type of rotating linkage. Naturally, NVH bushing 66 with sleeves 72 and 75 is merely one example of a pivoting connection and many other techniques for making pivoting connections may be utilized, including the nonlimiting examples of ball/roller bearing or heim joint/spherical bearings.

The detailed insets of FIGS. 1, 2, and 6A best demonstrate how the bushing on joint 65 (FIG. 1) is pinned at the camber slots 18 on ear sections 17 (FIG. 2), while the bushing at joint 64 is pinned to the upright arm 25 (FIG. 6A), which is in turn rigidly connected to wheel hub 22. FIGS. 6A and 6B illustrate how this rotating linkage assembly allows air spring 55 to compress and decompress along the substantially linear axis 60. FIG. 6A illustrates wheel hub 22 in its normal level position. FIG. 6B illustrates wheel hub 22 in a raised position, representative of when a tire on wheel hub encounters an uneven surface and is displaced upwards. FIG. 6B shows how the pivoting connections at joints 64 and 65 allow air spring 55 to compress substantially uniformly along the same linear axis 60 as wheel hub 22 experiences vertical displacement (e.g., the centerpoint of both ends of air spring 55 travel along axis 60 as air spring 55 compresses with only minor deviation). In a preferred embodiment, the deviation of the ends of air spring 55 from linear axis 60 (such deviation shown as angle "theta" in FIG. 6A) varies less than +/−10 degrees between the air spring's relaxed state (FIG. 6A) and the air spring's compressed state (FIG. 6B). However, variations of theta greater than 10 degrees are within the scope of the present invention.

FIG. 6A suggests how the airbag linearization assembly forms a first pivoting linkage connected to wheel hub to frame assembly 3 and H-arm 24 forms a second pivoting linkage connecting wheel hub 22 to frame assembly 3. These pivoting connections allow wheel hubs 22 to travel or rotate upward with respect to frame assembly 3.

The embodiment of FIG. 6A also demonstrates the axis of compression 60 being predominantly horizontal in orientation. "Predominantly horizontal" in this context means that the axis of compression is not greater than +/−45 degrees (angle gamma in FIG. 6A) with respect to the horizontal plane of the vehicle (i.e., the plane of the road surface on which the trike travels). The same concept can be described as axis of compression 60 being predominantly parallel to half shaft assemblies 21. In more preferred embodiments, gamma is less than 30 degrees. However, the angles theta and gamma are not dependant on one another. For example, an alternate embodiment of the invention could include a rotating linkage arrangement such that the axis of compression is oriented in a predominantly vertical orientation (gamma >45 degrees), but the variation of theta through the air spring's compressed and relaxed states is still less than 10 degrees.

FIG. 5A also illustrates how pivoting connection 62 between link arm 51 and seating bracket 52 may be used to define an axis of rotation 61 extending through the two pivoting connection points 62. This axis of rotation 61 seen in FIG. 5A is also perpendicular to axis of compression 60. In the embodiment of FIG. 5A, it can be seen how the seating bracket flanges 69 act to position axis of rotation 61 such that it extends through the body of air spring 55 at a point between the two ends of the air spring. The length of seating bracket flanges 69 will determine where along the length of air spring 55 that axis of rotation 61 intersects the air spring body and this point of intersection could vary from embodiment to embodiment. In many embodiments, the length of seating bracket flanges 69 are made as long as possible (thereby increasing the stability of air spring 55 within seating brackets 52) without interfering with the mechanical interactions of surrounding components.

In the embodiments illustrated in the drawings, air spring 55 is a sleeve type air spring such as model no. 58988 produced by Air Lift Company, Inc. of Lansing, Mich. However, other embodiments could use any type of spring member, including sleeve or bellows type air springs, piston and cylinder damping devices, steel coil springs, solid polymer springs, or any other conventional or future developed spring members. Many embodiments preferably utilize linearly compressing spring members, i.e., spring members designed to compress linearly along a single axis due to the lack of an articulating or pivoting mount.

Another aspect of rear frame/axel assembly 1 is a vibration dampening mechanism for differential 20. In one embodiment seen in FIGS. 3 and 4, the vibration dampening mechanism is a differential mounting assembly 35 which is positionable within frame assembly 3. The illustrated version of differential mounting assembly 35 generally includes at least two mounting racks 36A and 36B, with each mounting rack having a pair of bushing slots 38 and footings 42 which are connected to the structural members of frame assembly 3 (i.e., lateral frame members 13 in FIG. 1). The mounting rack 36A is also shown with rigid air spring brackets 53 which engage the ends of air springs 55 not connected to seating brackets 52 as described above. Viewing FIG. 4, differential mounting assembly 35 also includes a mounting plate 40 having a plurality of bushing apertures 46 allowing bushings 37 to be attached (e.g. with bolts 45) to mounting plate 40. Mounting plate 40 further has a series of bolt apertures following the pattern of bolts which normally connect differential cover 41 to differential housing 33. As will be understood viewing FIGS. 3 and 4, differential housing 33 is positioned on a first side of mounting plate 40 and differential cover 41 is position on the other side of mounting plate 40 with bolts 47 passing though differential cover 41 and mounting plate 40 before engaging differential housing 33. Enlarged elastomeric washers 39 may be positioned between various structures to provide additional vibration dampening. In one embodiment, the elastomeric washers are nylon reinforced rubber bushings having about an ⅛ inch thickness. Bushings 37 are fixed to mounting plate 40 by bolts 45 engaging bushing apertures 46 on mounting plate 40. Thereafter, when bushings 37 are positioned within bushing slots 38 on mounting racks 36, bushings 37 operate to dampen the transfer of vibration forces from differential 20 to the rest of frame assembly 3. In one embodiment, the bushings are NVH bushings having metal inner and outer sleeves with an elastomeric material in between.

The embodiment of mounting plate 40 seen in FIG. 4 includes a center opening 48 so that mounting plate 40 does not interfere with the internal components of differential 20. Furthermore, while the embodiment of FIGS. 3 and 4 show the bushings 37 connected to mounting plate 40, other embodiments could conceivably fix the bushings to mounting racks 36 or differential housing 33. The only requirement is that the bushing be operatively positioned between differential 20 and mounting racks 36. For example, both mounting racks 36 and mounting plate 40 may be considered to having engagement points for the bushings. In FIG. 4, mounting plate 40's engagement point are apertures 46 and mounting rack 36s' engagement points are bushing slots 38. However, in alternative embodiments the mounting points would be whatever surface the bushings engage or which fix the bushings to a particular structure.

Additionally, while FIGS. 3 and 4 illustrate mounting racks 36 positioned horizontally above and below differential 20, alternative embodiments could position mounting racks 36 in other orientations, e.g., vertically or diagonally within frame assembly 3. The illustrated embodiment shows mounting racks 36A and 36B positioned in an opposing orientation, i.e., above and below differential 20. A similar opposing orientation is obtained if the mounting racks are positioned vertically or diagonally on opposite sides of differential 20. It is not necessary that mounting racks 36 always be positioned in a directly opposing orientation, it is only necessary that the mounting racks be sufficiently opposing that the bushing will securely fix differential 20 on frame assembly 3.

Many embodiments will also include an adjustment mechanism allowing the toe/camber of wheel hub 22 to be varied. One embodiment of this toe/camber adjustment mechanism 9 is seen in the insets of FIGS. 2, 6A, and 17. Viewing the FIG. 2 insert, it is seen that longitudinal frame member 14 includes a pair of laterally extending ear sections 17. Ear sections 17 have a substantially horizontal slot 18 and cam stops 27 on either side of side of slot 18. The lower portion of vertical frame member 12 similarly includes a horizontal slot 19 and the cam stops 27. As used herein, "horizontal" denotes an item being generally parallel to the ground surface on which the wheels rest, while "vertical" denotes being generally perpendicular to such ground surface.

Another element of this toe/camber adjustment mechanism 9 are cam plates 28, one example of which is seen in the FIG. 6A insert and with more detail in FIG. 17. This embodiment of cam plate 28 comprises a circular body having a keyed aperture 90 and a series of position indicators 93. As one non-limiting example, the body of cam plate 28 is a steel coin-shaped plate approximately 1.125 inches in diameter and about 0.12 inches in thickness. This embodiment includes a "D" shaped keyed aperture 90, but any irregularly shaped aperture may be employed. It will be understood that the rod aperture is off-set from the center of the cam body in order to impart its cam function.

Viewing again FIGS. 2 and 6A, it can be envisioned how the rod (in the example of FIG. 17, the keyed bolt 91) will extend through the keyed aperture 90 in cam plate 28, through horizontal slot 18 in ear section 17, through pivoting connection point 65 on air spring linearization assembly 7, and through the opposing ear section 17 (see FIG. 1 insert). Rotation of cam plate 28 (by applying torque to the head of keyed bolt 91) counter-clockwise or clockwise will displace that end of the pivot rod (i.e., keyed bolt 91) to the right or left in horizontal slot 18. It will be understood that this left/right movement of the pivot rod in horizontal slot 18 causes a slight rotation of air spring linearization assembly 7 in a plane parallel with the ground surface and will therefore adjust the "camber" of a tire mounted on wheel hub assembly 22. Once the desired rotated position of cam plate 28 is obtained, a nut on keyed bolt 91 is tightened, locking the cam plate 28 into the selected position.

The horizontal cam slots 19 (FIG. 2) will be formed in the lower section of vertical frame members 12. These lower cam slots 19 will likewise have cam plates 28, one example of which could be the cam plate 28 seen in FIG. 17. Each cam slot 19 will have a cam plate 28 positioned thereon and separate keyed bolts 91 will engage the cam slots 19A and 19B formed through the vertical frame members 12. To adjust the "toe" of a tire mounted on wheel hub assembly 22, the cam plates 28 on cam slots 19A and 19B are adjusted (rotated) in the opposite directions (i.e., clockwise and counter-clockwise). Those skilled in the art will also comprehend that adjusting the cam plates 28 (on cam slots 19A and 19B) in the same direction is an alternate method of adjusting the camber of the wheels.

Another embodiment of the suspension system is seen in FIGS. 7 to 15. In this embodiment, rear frame/axel assembly 100 is adapted for belt driven motorcycles, one example of which are Harley-Davidson® motorcycles. Many features of this embodiment are the same as in the previous embodiments and the description of like components will not be repeated. In particular, the air spring linearization assembly 107 operates in the same manner as the earlier described air spring linearization assembly 7.

As seen in FIG. 7, rear frame/axel assembly 100 has a somewhat different structure for connecting to the front frame (seen in FIG. 10) of a motorcycle. Front frame supports 110 will have front mounting brackets 185 to which main frame mounts 186 are attached. Main frame mounts 186 will generally vary according to motorcycle model and form the attachment points to front frame connecting apertures 203 seen in FIG. 10 (i.e., by conventional bolts being inserted through mounting apertures 191 and connecting apertures 203). Similarly, upper frame mounts 187 in FIG. 7 will connect to uppers shock mount apertures 202 in FIG. 10.

Figures 12A, 12B:
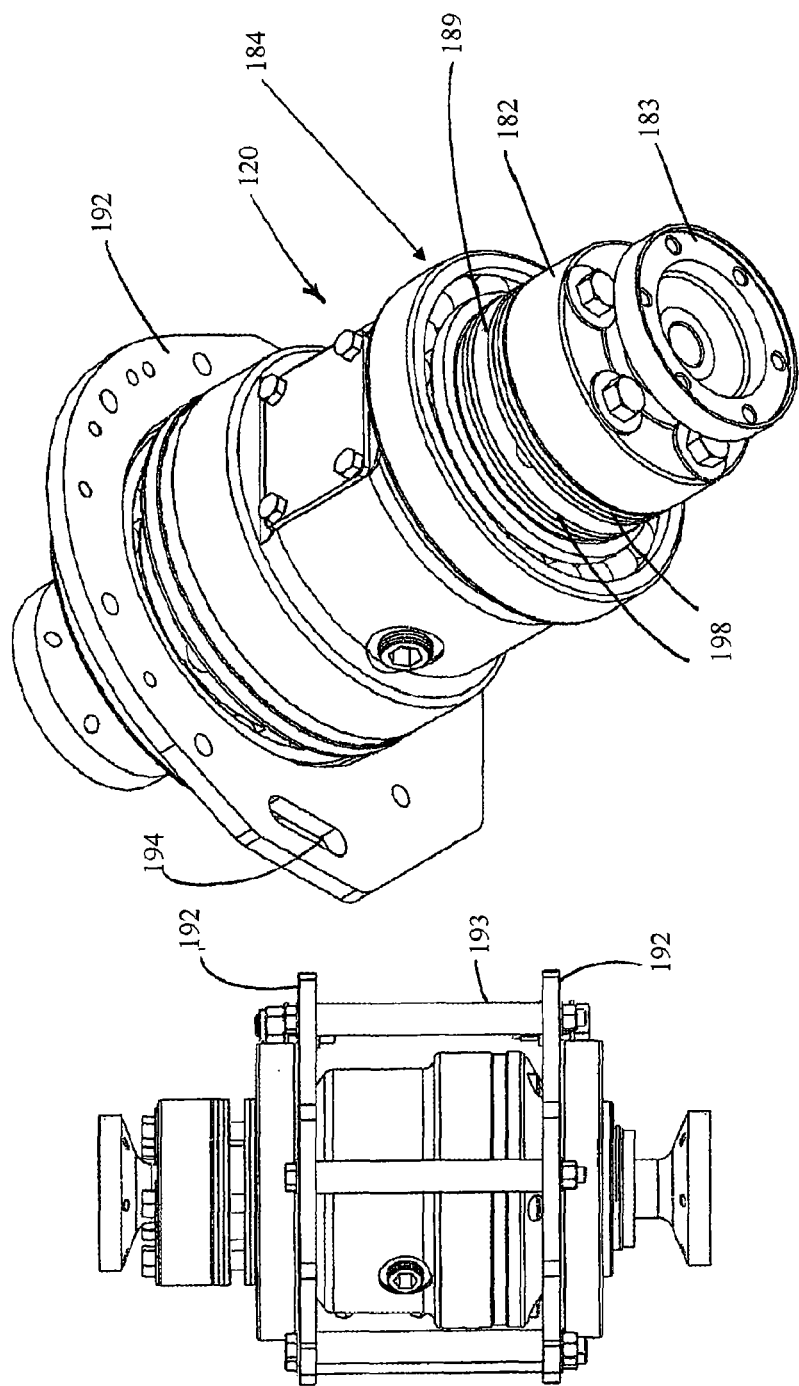

Although partially hidden from view, FIGS. 7 and 8 generally illustrate the belt driven differential 120 positioned within frame assembly 100. As better view of view of differential 120 removed from frame assembly 100 with certain related components is shown in FIG. 11A. This embodiment of differential 120 is illustrated in conjunction with differential mounting plates 190, differential flanges 192, differential mounting bars 205, and belt drive pulley 178. FIGS. 12A and 12B shows a further breakdown of differential 120 to illustrate how differential flanges 192 are mounted on main bearings 184 (e.g., by press fitting in this embodiment) and allows the differential 120 to rotate relative to differential flanges 192.

The embodiment of differential 120 shown in FIGS. 7, 8, 11, and 12 is constructed from conventional Ford® differential components. Those skilled in the art will recognize that a conventional spider gear set and carrier within differential 120 allows the inner stub shafts 183 to rotate at different speeds, such as when the vehicle turning causes the opposing wheels to rotate at different speeds. Of course, the scope of the invention should be considered sufficiently broad to cover many other conventional or future developed differential designs.

FIG. 12A shows how a series of flange bolts 193 will connect the two differential flanges 192 to provide the initial mounting structure for differential 120. FIG. 12B also shows the flange slot 194 which may have a bolt engaging mounting plates 190 and passing through flange slots 194 (see also FIG. 11B), thereby allowing limited relative movement of the differential flanges relative to mounting plates 190 for belt tensioning purposes as explain further below. The belt pulley mounting surface 189 provides the attachment surface for dive pulley 178. It will be understood that belt drive pulley 178 (FIG. 11A) is bracketed by the two sets of shims 198 (FIG. 12B) positioned on each side of belt drive pulley 178. Briefly, this is typically accomplished by removing pulley cap 182, positioning a first set of shims 198 on the differential, positioning the belt drive pulley 178 on pulley mounting surface 189 (belt drive pulley 178 is piloted onto the differential to center it so that it does not rotate out of round), and then positioning a second set of shims 198 before replacing and bolting pulley cap 182. The number of shims 198 in the first and second set may be used to adjust the position of belt drive pulley 178 along the length of the differential. Returning to FIG. 11A, it can be seen how in the illustrated embodiments, drive pulley 178 is positioned exterior to the main bearing 184, i.e., drive pulley 178 is closer to the end of differential shaft 182 than main bearings 184. However, other embodiments need not necessarily share this characteristic.

From the above described configuration, it may be seen how certain embodiments provide a method of connecting a two wheel, independent rear axial assembly to a front frame of a motorcycle. This method could include the steps of first disconnecting the half shaft from a main differential shaft which extends from the differential (at the connection point 300 seen in FIG. 8) as this differential comprises a belt drive pulley positioned exterior to main bearings on the differential. FIG. 11A illustrates the bolt apertures 301 which form the connection between the main differential shaft and the half shaft. Next the drive belt extending from the motorcycle transmission on the front frame is positioned on the belt drive pulley. Finally, the half shaft is reconnected to the main differential shaft. This method provides the significant advantage of allowing the installation of drive belt 175 without the need to disassemble the main bearings and a significant portion of the differential.

FIG. 11A also illustrates a belt tensioning mechanism 195. In this embodiment, belt tensioning mechanism 195, generally comprises a pair of cams 196 (only one is seen in FIG. 11A) separated by cam bolt 197. Cam bolt 197 has a hexagonal cross-section which engages mating hexagonal apertures in cams 196, thus allowing torque placed on cam bolt 197 to be transferred to cams 196. However, the ends of cam bolt 197 which engage the apertures in differential mounting plates 190 are rounded and can rotate in the apertures (at least prior to tightening of the nut engaging cam bolt 197 on the outside surface of mounting plate 190). It can be envisioned how rotation of cam bolt 197 will cause rotation of cams 196, which in turn cause the lobed surfaces of cams 196 to push against differential flange 192. The flange slots 194 seen in FIG. 12 (when the bolts engaging the slots are loosened) will allow limited relative movement between differential flanges 192 and mounting plates 190, thus allowing drive pulley 178 to be moved rearward to increase tension on a drive belt positioned on drive pulley 178. Thereafter, the bolts engaging differential flanges 192 and mounting plates 190 through flange slots 194 may be tightened to fix the relative position of differential flanges 192 and mounting plates 190 (thus maintaining tension in the drive belt 175)

In the illustrated embodiment, the differential 120 seen in FIG. 11A is secured to the rear frame assembly by way of the differential mounting bars 205. Although partially hidden from view in FIG. 7, it can been seen how differential mounting bar 205 abuts against the rear surface of front lateral frame member 113. Differential mounting bar 205 will be welded (or otherwise rigidly connected by any conventional means) to front lateral frame member 113. Although completely hidden from view in the figures, a second differential mounting bar 205 is connected to the front of base frame 111. In the illustrated embodiment, these two differential mounting bars 205 fix the position of differential 120 in frame assembly 103.

FIG. 13 best illustrates the detail components of the illustrated embodiment of differential mounting bars 205 and how these interact with mounting plates 190. The differential mounting bars include a connector plate 210 having a length roughly equivalent to the space between mounting plates 190 and connector plates 210 is fixed to (e.g., by welding) bushing housing 206. Bushing 206 generally comprises outer cylindrical metal sleeve 207, inner cylindrical metal sleeve 209, and elastomeric sections 208 inserted between the outer and inner sleeves. A bolt or other fastener 211 passes through inner sleeve 209 and an aperture in mounting plates 190. It will be readily apparent how fixing connector plates 210 to the frame assembly 103 fixes mounting plates 190 to the frame assembly 103, and thus fixes the differential 120 to frame assembly 103. It will also be apparent how the bushing section 208 will tend to dampen or absorb vibration and jarring forces between the frame assembly 103 and differential 120.

Another aspect of the FIG. 7 embodiment is the trans-differential strut 220 seen in FIGS. 14 and 15. Viewing FIG. 14A, trans-differential strut 220 generally comprises a pair of conventional heim joints 223 connected by internally threaded sleeve 222. Although hidden from view, it will be understood that heim joints 223 include threaded shafts which extend into threaded sleeve 222. As is well known in the art, the distance between the two heim joints 223 may be adjusted by rotating sleeve 222 such that the heim joint threaded shafts retract into or extend from sleeve 222. FIG. 14 further shows schematically a transmission casing 240 which is part of the motorcycle to which the rear frame assembly (and thus differential mounting plates 190) will be attached. A swing arm axle 230 associated with the motorcycle is positioned adjacent to the transmission casing and extends through the front frame axle apertures 201 (seen in FIG. 10) with rubber mounts 231 being the surface actually engaging the axle apertures 201.

FIG. 14B shows a cross-sectional view of swing arm axle 230 and how the components described above attach to swing arm axle 230. For example, it can be seen how swing arm axle 230 extends through transmission casing 240 with spacers 188 positioning rubber mounts 231 for engagement with the front frame (i.e., engagement with aperture 201 in FIG. 10). Heim joint 223 is also shown engaging swing arm axle 230 with its positioned being maintained by a somewhat shorter length spacer 188. From this description, it will be understood that swing arm axle 230 is the front frame connection point for trans-differential strut 220.

FIG. 14 also shows how a spacer rod 226 is positioned between differential mounting plates 190 and how the second heim joint 223 is positioned on spacer rod 226. FIG. 15 best illustrates the mechanical relation of trans-differential strut 220 to swing arm axle 230 (and thus front frame assembly 200) and to differential 120 (and thus rear frame assembly 103). In this embodiment, trans-differential strut 220 is positioned off-center, adjacent to, and generally in alignment with drive belt 175. This positioning of trans-differential strut 220 allows it to most efficiently bear the tension forces created by drive belt 175 and helps reduce wear and tear on other components (such as rubber mounts 231 in FIG. 14) which would tend to bear the stress of belt tension in the absence of trans-differential strut 220.

FIG. 8 illustrates another aspect of rear frame assembly 100 which includes electric reverse motor 181 attached to differential 120. It can be envisioned how reverse motor 181 (which is similar to a conventional starter motor) is a able to selectively engage reverse gear 180 which is in turn connected to the differential shaft opposite drive pulley 178. Although not explicitly shown in the figures, reverse gear 180 is connected to the differential shaft via shims and a mounting surface similar to that described for drive pulley 178 above. FIG. 16 is a schematic representation of one circuit 250 which could be utilized to control reverse motor 181. The illustrated motor 181 includes a conventional solenoid switch 260 causing the motor gear to extend and engage differential gear 180 and allow the drive motor component 261 to apply torque to differential gear 180. FIG. 16 shows opposing motorcycle handle bars 252A and 252B, each of which has an actuation switch 253A and 253B. In addition to the main system on/off switch 256, circuit 250 includes a series of relays 257 wired to perform the following functions. The circuit 250 requires that both switches 253A and 253B be simultaneously actuated to complete the circuit and supply power to reverse motor 181. Thus, an operator must have both hands gripping the handle bars and activating the switches 253A and 253B in order to travel in reverse. Additionally, circuit 250 includes the time delay relay 258 which limits the amount of time that motor 181 operates, thereby preventing excessive motor operation which could result in overheating and motor damage.

Naturally, alternate embodiments could eliminate the time delay function. Likewise, alternate embodiments could conceivable require some other actuation sequence of switches 253A and 253B. Nor is circuit 250 limited to the use of relays. Any circuit implementing the same functions, whether by programmable logic controllers, limited instruction set processors, or other circuitry types, is within the scope of the present invention.

The foregoing disclosure describes certain three wheel motorcycles, certain suspensions systems (which are not necessarily limited to three wheel motorcycles), and related inventions which may satisfy one or more of the advantages set forth above. Although the preferred embodiments have been described in detail, it should be understood that various changes, substitutions, and alterations can be made herein without departing from the scope of the present invention, even if all of the advantages identified above are not present. For example, while the figures illustrate the suspension system being associated with the rear two wheels of a trike vehicle, the suspension system could also be used on a four (or more) wheeled vehicle, or a three wheel vehicle having two front wheels. Likewise, while the suspension system is illustrated with a differential, the same suspension system could be employed without a differential and provide independent suspension for a set of non-drive wheels. As a particular example, a rack and pinion steering system could be substituted for the differential assembly.

The various embodiments shown in the drawings herein illustrate that the present invention may be implemented and embodied in a variety of different ways that still fall within the scope of the present invention. A series of nonlimiting example embodiments are as follows.

Embodiment A includes a suspension system for a motor vehicle comprising a frame assembly; a differential supported on the frame assembly; two half shaft assemblies engaging the differential and being pivotally connected to the frame assembly; and at least one air spring operatively positioned between the frame assembly and each of the half shaft assemblies, the air spring connected to a rotating linkage which maintains a substantially linear axis of compression for the air spring.

Variations on embodiment A include: (i) wherein the air spring is positioned on a seating bracket which is pivotally connected to the rotating linkage; (ii) wherein the pivotal connection forms an axis of rotation perpendicular to the axis of compression; (iii) wherein the axis of rotation extends through a body of the air spring between ends of the air spring; (iv) wherein the rotating linkage constrains variations from the axis of compression to within plus or minus about 10 degrees: (v) wherein each of the half shaft assemblies include a wheel hub assembly having a rigid link connected to the rotating linkage; (vi) wherein the rigid link is an upright arm rigidly connected to the wheel hub; (vii) wherein the rotating linkage comprises a camber link rigidly connected to a link arm; (viii) wherein the camber link is rotationally connected to the upright arm and the link arm is rotationally connected to the seating bracket; (ix) wherein the half shaft assemblies include a wheel hub and upper and lower pivoting linkages connected to the wheel hub; (x) wherein a spring shock absorber is connected between the lower pivoting linkages and the frame assembly; (xi) wherein the air springs are sleeve type air springs; (xii) wherein the air springs are oriented to have a predominantly horizontal axis of compression; (xiii) wherein the axis of compression is within plus or minus 30 degrees of a horizontal plane of the vehicle; (xiv) wherein the rotating linkages have a first pivotal connection to the wheel hubs and a second pivotal connection to the seating brackets; (xv) wherein the first pivotal connection to the wheel hubs comprises a rotating connection to an upright arm rigidly connected to the wheel hub; and (xvi) wherein the rotating linkages are pivotally connected to the frame assembly.

Embodiment B includes a three wheel motor cycle comprising a front frame assembly including a single wheel; a rear frame assembly; a differential supported on the rear frame assembly; two half shaft assemblies engaging the differential and being pivotally connected to the rear frame assembly; and at least one air spring operatively positioned between the rear frame assembly and each of the half shaft assemblies, the air springs connected to a rotating linkage which maintains a predominantly linear axis of compression for the air springs.

Variations on Embodiment B include (i) wherein the air spring is positioned on a seating bracket which is pivotally connected to the rotating linkage; (ii) wherein the pivotal connection forms an axis of rotation perpendicular to the axis of compression; (iii) wherein the axis of rotation extends through a body of the air spring between ends of the air spring; and (iv) wherein the rotating linkages have a first pivotal connection to the wheel hubs and a second pivotal connection to the seating brackets.

Embodiment C includes an air spring suspension system for a three wheel motorcycle comprising a frame assembly; a differential supported on the frame assembly; two half shaft assemblies engaging the differential and being pivotally connected to the frame assembly; and at least one air spring operatively positioned between the frame assembly and each of the half shaft assemblies, the air springs oriented to have a predominantly horizontal axis of compression.

Variations on Embodiment C include: (i) wherein the axis of compression is within plus or minus 30 degrees of a horizontal plan of the vehicle; (ii) wherein the differential is connected to a belt pulley; and (iii) wherein at least two differential mounting plates are connected between the frame and the differential.

Embodiment D includes an air spring suspension system for a three wheel motorcycle comprising a frame assembly; a differential supported on the frame assembly; two half shaft assemblies engaging the differential and being pivotally connected to the frame assembly; at least one air spring operatively positioned between the frame assembly and each of the half shaft assemblies; and a pivoting linkage connecting the air springs to the half shaft assemblies wherein upward rotational displacement of the half shaft assemblies relative to the differential exerts a compressive force on the air springs.

Embodiment E includes a vehicle frame with a vibration dampened differential, the vehicle frame comprising a frame assembly including a least two opposing mounting racks each having at least one bushing engagement point; a mounting plate having a plurality of bushing engagement points positioned to engage the engagement points on the mounting racks; a differential housing engaging a first side of the mounting plate; and a plurality of bushings positioned between the mounting rack engagement points and the mounting plate engagement points.

Variations on Embodiment E include: (i) wherein the mounting rack engagement points are bushing slots and the mounting plate engagement points are bolts connecting the bushings to the mounting plate; (ii) wherein a differential cover engages a second side of the mounting plate; (iii) wherein the plurality of bushings comprise at least four NVH bushings; (iv) wherein the mounting racks are positioned horizontally above and below the differential; (v) wherein the differential housing comprises bushing slots positioned to engage the bushings; and (vi) wherein the mounting plate has a center opening over which the differential cover is positioned.

Embodiment F includes a three wheel motorcycle comprising a front frame assembly including two opposing handle bars; a rear frame assembly including a differential driving two rear wheels; at least two differential mounting plates connected to the differential; and at least two differential mounting bars positioned between the mounting plates and connecting the differential to the frame.

Variations on Embodiment F include: (i) wherein the differential includes main bearings and the drive pulley is positioned exterior to the main bearings; (ii) wherein the differential mounting bars comprise at least one bushing; (iii) wherein the differential mounting bars comprise a connector plate and at least two bolts attaching the connector plate to the mounting plates and NVH bushings positioned between the bolts and the connector plates; (iv) wherein the bushings are positioned between the inner/outer sleeves and the outer sleeves attach to the connector plates; (v) further comprising a belt tensioning mechanism positioned between the differential mounting plates; (vi) wherein the belt tensioning mechanism includes at least one cam surface engaging the differential and causing relative movement between the differential and the differential mounting plates; (vii) wherein the differential includes at least two flanges which engage the differential mounting plates; (viii) wherein at least one of the flanges or differential mounting plates have slots to allow relative movement there between; (ix) wherein a spacer rod extends between the mounting plates and a trans-differential strut connects to the spacer rod, the trans-differential strut comprising a first heim-joint engaging the spacer rod, a second heim-joint for engaging an axial on the front frame assembly, and a threaded sleeve for adjusting the relative distance between the first and second heim-joints; and (x) wherein the flanges have the slots formed therein.

Embodiment G includes a three wheel motorcycle comprising a front frame assembly including two opposing handle bars; a rear frame assembly including a differential driving two rear wheels; an electric reverse motor engaging the differential; and a reverse motor activation circuit having at least one switch on each handle bar and requiring the actuation of switches on both handle bars to activate the reverse motor.

Variations on Embodiment G include: (i) wherein each handle bar has a single reverse motor activation switch; and (ii) wherein the circuit requires simultaneous actuation of switches on both handle bars to activate the reverse motor.

Embodiment H includes a three wheel motorcycle including an independent suspension assembly, the suspension assembly comprising a frame assembly; a differential; two half-shaft assemblies connecting to the differential; and at least two differential mounting members on the frame assembly, the mounting members including a polymer bushing positioned between the frame assembly and the differential to dampen differential vibration/movement.

Variations on Embodiment H include: (i) wherein the polymer bushing is an NVH bushing; (ii) wherein the mounting members comprise opposing mounting racks connected to the frame assembly; (iii) wherein a. the mounting racks each having at least one bushing engagement point; b. the differential having a mounting plate with a plurality of bushing engagement points positioned to engage the engagement points on the mounting racks; and a plurality of bushings positioned between the mounting rack engagement points and the mounting plate engagement points; (iv) wherein the mounting members comprise differential mounting bars positioned between differential mounting flanges and connecting the differential to the frame; (v) wherein the differential mounting bars comprise at least one bushing; (vi) wherein the differential mounting bars comprise a connector plate and at least two bolts attaching the connector plate to the mounting plates and NVH bushings positioned between the bolts and the connector plates; and (vii) wherein the bushings are positioned between the inner/outer sleeves and the outer sleeves attach to the connector plates.

Embodiment I includes a suspension system for a motor vehicle comprising a frame assembly; two independent wheel hub assemblies being pivotally connected to the frame assembly; and at least one spring member operatively positioned between the frame assembly and each of the wheel hub assemblies, the spring member connected to a rotating linkage which maintains a substantially linear axis of compression for the spring member.

Variations on Embodiment I include: (i) wherein the air spring is positioned on a seating bracket which is pivotally connected to the rotating linkage; (ii) wherein the pivotal connection forms an axis of rotation perpendicular to the axis of compression; (iii) wherein the axis of rotation extends through a body of the air spring between ends of the air spring; (iv) wherein the rotating linkages have a first pivotal connection to the wheel hubs and a second pivotal connection to the seating brackets; (v) wherein the spring member is a linearly compressing spring member; (vi) wherein the air spring is positioned on a seating bracket which is pivotally connected to the rotating linkage; (vii) wherein the spring member is an air spring; (viii) wherein the air spring is a sleeve type air spring.

Embodiment J includes a suspension system for a motor vehicle comprising a frame assembly; a differential supported on the frame assembly; two half shaft assemblies engaging the differential and being pivotally connected to the frame assembly; and at least one spring member operatively positioned between the frame assembly and each of the half shaft assemblies, the spring member connected to a rotating linkage which maintains a substantially linear axis of compression for the spring member.

Variations on Embodiment J include: (i) wherein the spring member is a linearly compressing spring member; (ii) wherein the air spring is positioned on a seating bracket which is pivotally connected to the rotating linkage; (iii) wherein the spring member is an air spring; and (iv) wherein the air spring is a sleeve type air spring.

Also, the techniques, designs, elements, and methods described and illustrated in the preferred embodiment as discrete or separate may be combined or integrated with other techniques, designs, elements, or methods without departing from the scope of the present invention. Other examples of changes, substitutions, and alterations are readily ascertainable by one skilled in the art and could be made without departing from the spirit and scope of the present invention.

We claim:

1. A three wheel motorcycle comprising:
   a. a front frame assembly including a single wheel;
   b. a rear frame assembly;
   c. a differential supported on the rear frame assembly;
   d. a wheel hub attached to each of two half shaft assemblies engaging the differential and being pivotally connected to the frame assembly;
   e. at least one spring member operatively positioned between the frame assembly and each of the wheel hubs wherein:
      i. the spring member is connected to a rotating linkage which maintains a substantially linear axis of compression for the spring member;
      ii. the rotating linkage forms a pivotal connection having an axis of rotation substantially perpendicular to the axis of compression; and
      iii. the axis of rotation extends through a body of the spring member between ends of the spring member.

2. The three wheel motorcycle according to claim 1, wherein the spring member is positioned on a seating bracket which is pivotally connected to the rotating linkage.

3. The three wheel motorcycle according to claim 1, wherein the rotating linkage constrains variations from the axis of compression to within plus or minus about 10 degrees.

4. The three wheel motorcycle according to claim 1, wherein the spring members are sleeve type air springs.

5. The three wheel motorcycle according to claim 1, wherein the spring members are oriented to have a predominantly horizontal axis of compression.

6. The suspension system according to claim 1, wherein each of the wheel hubs includes a rigid upright arm connected to the rotating linkage.

7. The three wheel motorcycle according to claim 6, wherein each rotating linkage has a first pivotal connection to the rigid upright arm and a second pivotal connection to the seating brackets.

8. The three wheel motorcycle according to claim 1, further comprising:
   a. the rear frame assembly including at least two opposing mounting racks each having at least one bushing engagement point;
   b. a mounting plate having a plurality of bushing engagement points positioned to engage the engagement points on the mounting racks;
   c. a differential housing engaging a first side of the mounting plate; and
   d. a plurality of bushings positioned between the mounting rack engagement points and the mounting plate engagement points.

9. The three wheel motorcycle according to claim 1, further comprising:
   a. the front frame assembly including two opposing handle bars;
   b. the rear frame assembly including the differential driving two rear wheels;
   c. at least two differential mounting plates connected to the differential; and
   d. at least two differential mounting bars positioned between the mounting plates and connecting the differential to the frame.

10. The three wheel motorcycle according to claim 9, wherein the differential includes main bearings and a drive pulley is positioned exterior to the main bearings.

11. The three wheel motorcycle according to claim 10, wherein a spacer rod extends between the mounting plates and a trans-differential strut connects to the spacer rod, the trans-differential strut comprising a first heim-joint engaging the spacer rod, a second heim-joint for engaging an axle on the front frame assembly, and a threaded sleeve for adjusting the relative distance between the first and second heim-joints.

12. The three wheel motorcycle according to claim 10, further comprising a belt tensioning mechanism positioned between the differential mounting plates.

13. The three wheel motorcycle according to claim 12, wherein the belt tensioning mechanism includes at least one cam surface engaging the differential and causing relative movement between the differential and the differential mounting plates.

14. The three wheel motorcycle according to claim 9, further comprising:
   a. an electric reverse motor engaging the differential;
   b. a reverse motor activation circuit having at least one switch on each handle bar and requiring the actuation of switches on both handle bars to activate the reverse motor.

15. The three wheel motorcycle according to claim 9, wherein (i) the differential includes at least two flanges which engage the differential mounting plates; and (ii) at least one of the flanges or differential mounting plates have slots to allow relative movement there between.

16. The three wheel motorcycle according to claim 1, further comprising at least two differential mounting members on the rear frame assembly, the mounting members including a polymer bushing positioned between the rear frame assembly and the differential to dampen differential vibration/movement.

17. The three wheel motorcycle according to claim 16, wherein the mounting members comprise opposing mounting racks connected to the rear frame assembly.

18. The three wheel motorcycle according to claim 16, wherein the mounting members comprise differential mounting bars positioned between differential mounting flanges and connecting the differential to the rear frame assembly.

* * * * *